United States Patent
Li et al.

(10) Patent No.: US 9,949,263 B2
(45) Date of Patent: Apr. 17, 2018

(54) FREQUENCY RESOURCE ALLOCATION FOR A NARROW-BAND CELLULAR INTERNET OF THINGS SYSTEM

(71) Applicant: QUALCOMM Incorporated, San Diego, CA (US)

(72) Inventors: Junyi Li, Chester, NJ (US); Navid Abedini, Raritan, NJ (US); Xiao Feng Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 149 days.

(21) Appl. No.: 14/988,878

(22) Filed: Jan. 6, 2016

(65) Prior Publication Data
US 2016/0249358 A1    Aug. 25, 2016

Related U.S. Application Data

(60) Provisional application No. 62/120,763, filed on Feb. 25, 2015.

(51) Int. Cl.
*H04W 72/04* (2009.01)
*H04B 1/715* (2011.01)
*H04L 5/00* (2006.01)

(52) U.S. Cl.
CPC ........ *H04W 72/0453* (2013.01); *H04B 1/715* (2013.01); *H04L 5/0062* (2013.01);
(Continued)

(58) Field of Classification Search
CPC .......... H04W 72/0453; H04W 72/0413; H04B 1/715; H04L 5/0062; H04L 5/0066; H04L 5/0073; H04L 5/0007; H04L 5/0012
See application file for complete search history.

(56) References Cited

U.S. PATENT DOCUMENTS

2008/0247375 A1* 10/2008 Muharemovic ... H04W 72/0426
370/344
2011/0211482 A1* 9/2011 Hoshino ............... H04L 1/0026
370/252
(Continued)

FOREIGN PATENT DOCUMENTS

EP    1940059 A1    7/2008
GB    2454513 A     5/2009

OTHER PUBLICATIONS

ISA/EPO, International Search Report and Written Opinion of the International Searching Authority, Int'l Appl. No. PCT/US2016/012507, dated Apr. 20, 2016, European Patent Office, Rijswijk, NL, 13 pgs.

(Continued)

*Primary Examiner* — Walli Butt
(74) *Attorney, Agent, or Firm* — Holland & Hart/Qualcomm

(57) ABSTRACT

Improved systems, methods, and apparatuses for allocation of frequency resources, or tones, for a Cellular Internet of Things (CIoT) system are described. In various aspects, interference may be reduced for a CIoT system and an adjacent wireless communications system through identifying a first group of narrowband tones for the CIoT system that will have reduced interference with wideband tone transmissions of the adjacent wireless communications system and may thus support higher power transmissions.

30 Claims, 16 Drawing Sheets

(52) U.S. Cl.
CPC .......... *H04L 5/0066* (2013.01); *H04L 5/0073* (2013.01); *H04W 72/0413* (2013.01); *H04L 5/0007* (2013.01); *H04L 5/0012* (2013.01)

(56) References Cited

U.S. PATENT DOCUMENTS

| | | | | |
|---|---|---|---|---|
| 2013/0301552 | A1* | 11/2013 | Xu | H04W 4/005 370/329 |
| 2013/0322363 | A1* | 12/2013 | Chen | H04W 72/042 370/329 |
| 2015/0264718 | A1* | 9/2015 | Yu | H04W 72/02 370/329 |
| 2017/0164350 | A1* | 6/2017 | Sun | H04W 72/0413 |

OTHER PUBLICATIONS

Texas Instruments, "Inter-Cell Interference Mitigation for EUTRA," 3GPP TSG RAN WG1, R1-051059, San Diego, USA, Oct. 10-14, 2005, 7 pgs., XP_50100676A, 3rd Generation Partnership Project.

Tu et al., "Adaptive Subband Selection in OFDM-based Cognitive Radios for Better System Coexistence," 2008 3rd International Conference on Cognitive Radio Oriented Wireless Networks and Communications (CrownCom 2008), Singapore, May 15-17, 2008, 8 pgs., XP_55263969A, Institute of Electrical and Electronics Engineers.

* cited by examiner

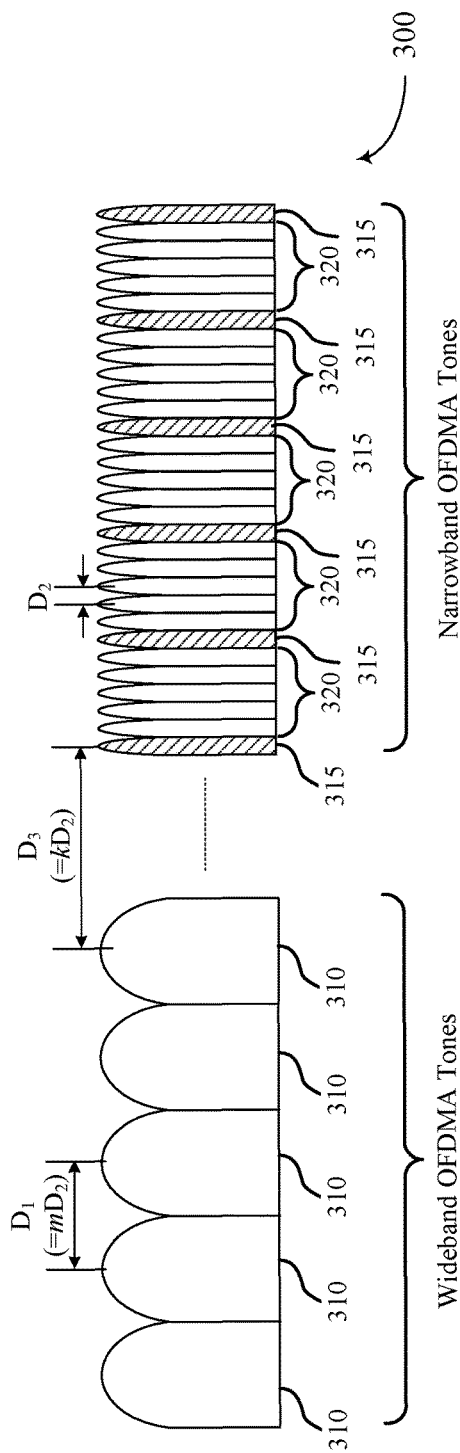
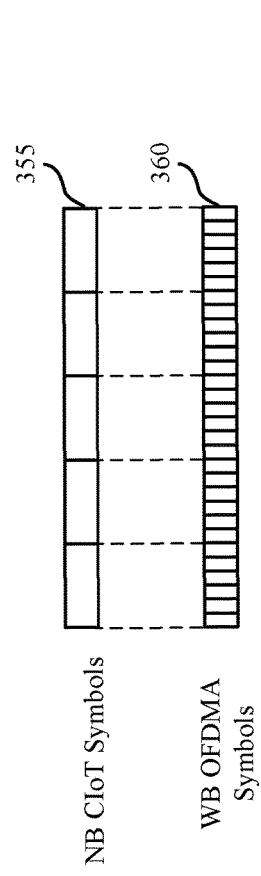
FIG. 3A
FIG. 3B

FREQUENCY RESOURCE ALLOCATION FOR A NARROW-BAND CELLULAR INTERNET OF THINGS SYSTEM

CROSS REFERENCES

The present Application for Patent claims priority to U.S. Provisional Patent Application No. 62/120,763 by Li et al., entitled "Frequency Resource Allocation For A Narrow-Band Cellular Internet Of Things System," filed Feb. 25, 2015, assigned to the assignee hereof, and expressly incorporated by reference herein.

BACKGROUND

Field of Disclosure

The following relates generally to wireless communication, and more specifically to allocation of frequency resources (tones) for a Cellular Internet of Things (CIoT) system.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system).

By way of example, a wireless multiple-access communications system may include a number of base stations, each simultaneously supporting communication for multiple communication devices, which may be otherwise known as a user equipment (UE). A base station may communicate with UEs on downlink channels (e.g., for transmissions from a base station to a UE) and uplink channels (e.g., for transmissions from a UE to a base station).

Some UEs may provide for automated communication. Automated UEs may include those implementing Machine-to-Machine (M2M) communication or Machine Type Communication (MTC). M2M or MTC may refer to data communication technologies that allow devices to communicate with one another or a base station without human intervention. M2M or MTC devices may include UEs and may be used as part of an Internet of Things (IoT). Some M2M or MTC devices in an IoT may include parking meters, water and gas meters, and other sensors that may infrequently communicate small amounts of data.

In some cases, including in an IoT, a UE may be a power limited device designed for low throughput or infrequent data transfers. In some cases a UE may be configured to transmit and receive wireless communications on frequency bands that overlap with other wireless communications bands of adjacent wireless communications networks. Such overlap may result in interference to one or both wireless communications networks.

SUMMARY

The present disclosure may relate generally to wireless communications systems, and more particularly to improved systems, methods, and apparatuses for allocation of frequency resources, or tones, for a Cellular Internet of Things (CIoT) system. In various aspects, interference may be reduced for a CIoT system and an adjacent wireless communications system through identifying a first group of tones for the CIoT system that will have reduced interference with transmissions of the adjacent wireless communications system and may thus support higher power transmissions.

User equipments (UEs) in the CIoT system that have relatively poor channel conditions and would benefit from higher power transmissions may be identified. Communications with such UEs can be performed through the first group of tones supporting higher power transmissions, and communications with other UEs that have more favorable channel conditions may be performed through other tones having lower power transmissions. In certain examples, frequency diversity may be employed to further enhance interference mitigation through frequency hopping amongst tones of the first group of tones. In some examples, the remaining tones may be divided into two or more subsets through fractional frequency reuse (FFR) techniques to provide interference averaging and further interference mitigation.

A method of wireless communication at a wireless device is described. The method may include identifying a first set of narrowband tones for wireless communications on a first wireless communications network, and identifying a first group of tones from the first set of narrowband tones that support higher power transmissions than a second group of tones of the first set of narrowband tones, the identification based at least in part on an interference level between tones of the first group and second set of wideband tones for wireless communications on a second wireless communications network.

An apparatus for wireless communication at a wireless device is described. The apparatus may include means for identifying a first set of narrowband tones for wireless communications on a first wireless communications network, and means for identifying a first group of tones from the first set of narrowband tones that support higher power transmissions than a second group of tones of the first set of narrowband tones, the identification based at least in part on an interference level between tones of the first group and second set of wideband tones for wireless communications on a second wireless communications network.

A further apparatus for wireless communication at a wireless device is described. The apparatus may include a processor, memory in electronic communication with the processor, and instructions stored in the memory, wherein the instructions are executable by the processor to identify a first set of narrowband tones for wireless communications on a first wireless communications network, and identify a first group of tones from the first set of narrowband tones that support higher power transmissions than a second group of tones of the first set of narrowband tones, the identification based at least in part on an interference level between tones of the first group and second set of wideband tones for wireless communications on a second wireless communications network.

A non-transitory computer-readable medium storing code for wireless communication at a wireless device is described. The code may include instructions executable to identify a first set of narrowband tones for wireless communications on a first wireless communications network, and identify a first group of tones from the first set of narrowband tones that support higher power transmissions than a second group of tones of the first set of narrowband tones, the identification based at least in part on an interference level between tones of the first group and second set of wideband tones for wireless communications on a second wireless communications network.

In some examples of the method, apparatuses, or non-transitory computer-readable medium described above, the first set of narrowband tones comprise a plurality of tones having a first frequency spacing between adjacent tones in a first available uplink/downlink bandwidth of the first wireless communications network, the second set of wideband tones comprise a plurality of tones having a second frequency spacing between adjacent tones in a second available uplink/downlink bandwidth of the second wireless communications network, and the second frequency spacing is an integer multiple of the first frequency spacing. Additionally or alternatively, in some examples a spacing between frequency carriers of the first wireless communications network and the second wireless communications network is an integer multiple of the first frequency spacing.

In some examples of the method, apparatuses, or non-transitory computer-readable medium described above, the first group of tones comprise tones that generate less interference with tones of the second set of wideband tones relative to the second group of tones of the first set of narrowband tones. Additionally or alternatively, some examples may include determining that a UE has channel conditions that warrant transmissions on the first group of tones, and transmitting a resource allocation to the UE indicating the first group of tones are allocated for use in uplink transmissions on the first wireless communications network.

Some examples of the method, apparatuses, or non-transitory computer-readable medium described above may further include transmitting one or more downlink transmissions to a first UE using higher power transmissions on one or more tones of the first group of tones, and transmitting one or more downlink transmissions to a second UE using lower power transmissions on one or more tones of the second group tones. Additionally or alternatively, some examples may include determining that the first UE has channel conditions that indicate higher power transmissions are necessary for reliable communications.

In some examples of the method, apparatuses, or non-transitory computer-readable medium described above, the determining is based at least in part on a latency target for the communications to the first UE and a path loss associated with the first UE. Additionally or alternatively, some examples may include the transmission of one or more downlink transmissions to the first UE comprising transmission using frequency hopping among tones of the first group of tones.

Some examples of the method, apparatuses, or non-transitory computer-readable medium described above may further include employing fractional frequency reuse within the second group of tones to identify two or more subsets of the second group of tones, and transmitting downlink communications on the two or more subsets using different transmission powers that are each lower than a transmission power for the first group of tones. Additionally or alternatively, in some examples identifying the first group of tones from the first set of narrowband tones comprises receiving a resource allocation from a base station indicating the first group of tones are to be used for uplink transmissions.

Some examples of the method, apparatuses, or non-transitory computer-readable medium described above may further include transmitting one or more uplink transmissions to a base station on one or more tones of the first group of tones. Additionally or alternatively, some examples may include the transmission of one or more uplink transmissions to the base station comprising transmission using frequency hopping among tones of the first group of tones.

Some examples of the method, apparatuses, or non-transitory computer-readable medium described above may further include receiving a resource allocation from a base station indicating the second group of tones are to be used for uplink transmissions, employing fractional frequency reuse within the second group of tones to identify two or more subsets of the second group of tones, and transmitting uplink communications on the two or more subsets using different transmission powers that are each lower than a transmission power for the first group of tones. Additionally or alternatively, in some examples the first set of narrowband tones comprise orthogonal frequency division multiple access (OFDMA) tones and the second set of wideband tones comprise OFDMA tones.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures are provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 3A illustrates an example of frequency domain locations of frequency tones for a CIoT system and an adjacent wireless communications system in accordance with various aspects of the present disclosure;

FIG. 3B illustrates an example of time domain locations of symbols transmitted in a CIoT system and an adjacent wireless communications system in accordance with various aspects of the present disclosure;

DETAILED DESCRIPTION

Figure 1:
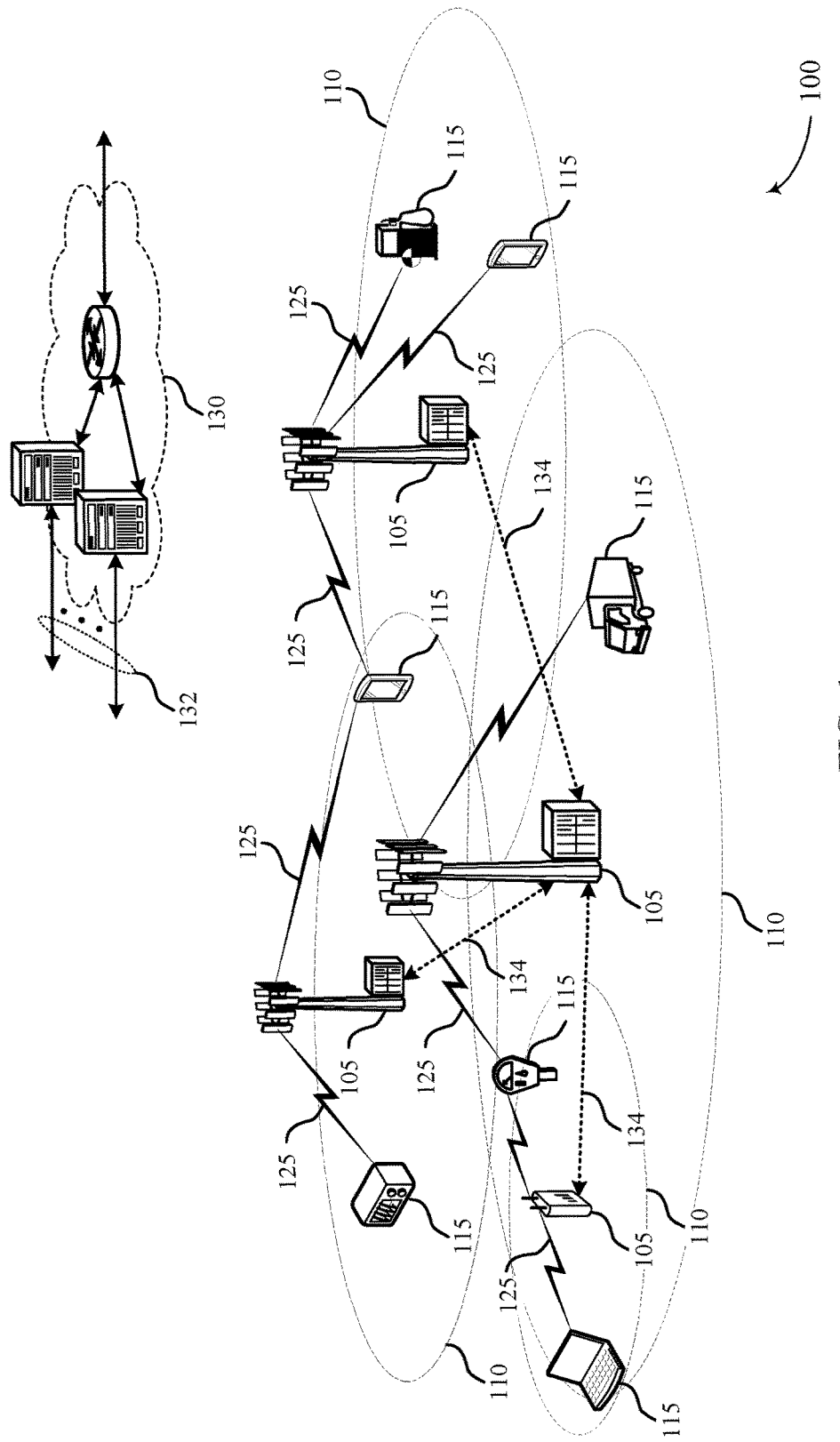
FIG. 1 illustrates an example of a wireless communications system for allocation of the frequency resources for a Cellular Internet of Things (CIoT) system in accordance with various aspects of the present disclosure.

A network of automated devices which communicate wirelessly may, in some cases, be referred to as the Internet of Things (IoT). Devices which communicate over the IoT network (e.g., machine type communication (MTC) devices) may include automated meters, sensors, and the like. In some instances, the automated devices may have relatively low throughput applications (e.g., a water level sensor sending an update to a base station). There may be a number of wireless communication systems available for use by the automated devices, including cellular systems operating in licensed spectrum, referred to as a Cellular Internet of Things (CIoT). However, cellular systems may be used for devices which use high through-put applications. Devices that operate according to low throughput conditions (e.g., infrequent and small data transfers) may present design considerations different from those associated with higher through-put devices. For example, an automated device may be designed to operate for long periods of time without battery replacement.

In some cellular systems, such as LTE, there may be a well-defined channel structure, having a relatively wide bandwidth and relatively widely separated frequency tones (e.g., 15 kHz tone spacing). Furthermore, an adjacent CIoT system may have a relatively narrow bandwidth (e.g., 200 kHz bandwidth with 72 tones spaced by 2.5 kHz), sufficient to support data transmission rates for the relatively small and infrequent transmissions of UEs in the CIoT system. Thus, it may be appropriate for a CIoT device and a CIoT base station to operate according to allocation of frequency resources which compensates for IoT design considerations.

For example, allocation of frequency resources may be determined based on channel conditions of CIoT UEs and tones that may support higher power transmissions. In some examples, the CIoT system may be a narrowband orthogonal frequency division multiple access (OFDMA) system, and a neighboring wireless communications system may be a wideband OFDMA system. In some examples, a network deployment may include the wideband OFDMA system having a tone spacing that is an integer (m) multiple of the tone spacing of the narrowband OFDMA CIoT system. Furthermore, the deployment may provide that a distance between the frequency carriers of the two systems is an integer (K) multiple of the narrowband OFDMA CIoT system tone spacing. In such a deployment scenario, one out of every m narrowband tones does not interfere with the tones in the adjacent wideband OFDMA system.

For example, many LTE deployments employ 15 kHz tone spacing, and one out of every six CIoT tones (with 2.5 KHz tone spacing) has very little, or no, interference with any of the LTE tones. These tones that have reduced interference may be grouped into a first group of tones, and these tones may be used for transmissions with relatively high power (e.g., user equipment (UE) devices corresponding to the worst path loss). The remaining tones can be dynamically allocated to UEs with a smaller path loss which in return need relatively lower transmit power. Devices using the first group of tones may, in some examples, employ frequency hopping (using different tones over subsequent time slots) to achieve some interference averaging effect. Devices using the remaining tones may, in some examples, use FFR techniques to provide enhanced interference mitigation. The LTE tones and the CIoT tones may each be, in various examples, OFDMA tones.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 in accordance with various aspects of the present disclosure. The wireless communications system 100 includes base stations 105, at least one UE 115, and a core network 130. The core network 130 may provide user authentication, access authorization, tracking, internet protocol (IP) connectivity, and other access, routing, or mobility functions. The base stations 105 interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro and/or small cell base stations). There may be overlapping geographic coverage areas 110 for different technologies.

In some examples, the wireless communications system 100 is a Long Term Evolution (LTE)/LTE-Advanced (LTE-A) network. In LTE/LTE-A networks, the term evolved node B (eNB) may be generally used to describe the base stations 105, while the term UE may be generally used to describe the UEs 115. The wireless communications system 100 may be a heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs 115 with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or packet data convergence protocol (PDCP) layer may be IP-based. A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARD) to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

In the wireless communications system 100, some UEs 115 may provide for automated communication. Automated wireless devices may include those implementing Machine-to-Machine (M2M) communication or Machine Type Communication (MTC). M2M communication and/or MTC may refer to data communication technologies that allow devices to communicate with one another or a base station without human intervention. For example, M2M communication and/or MTC may refer to communications from devices that integrate sensors or meters to measure or capture information and relay that information to a central server or application program that can make use of the information or present the information to humans interacting with the program or application. Some UEs 115 may be MTC devices, such as those designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. An MTC device may operate using half-duplex (one-way) communications at a reduced peak rate. MTC devices may also be configured to enter a power saving "deep sleep" mode when not engaging in active communications. The UEs 115 in wireless communications system 100 that are M2M or MTC devices may also be part of an IoT. Thus, wireless communications system 100 may also include or be part of an IoT system.

The communication links 125 shown in wireless communications system 100 may include uplink transmissions from a UE 115 to a base station 105, and/or downlink transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

In some embodiments of the wireless communications system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple input multiple output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

A UE 115 attempting to access a wireless network may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Both the PSS and the SSS may be located in the central 6 resource blocks (RBs) (72 subcarriers) of a carrier. After receiving the PSS and SSS, the UE 115 may receive a master information block (MIB), which may be transmitted in a physical broadcast channel (PBCH). The MIB may contain system bandwidth information, as well as tone spacing. After decoding the MIB, the UE 115 may receive one or more system information block (SIBs). For example, SIB1 may contain cell access parameters and scheduling information for other SIBs. Decoding SIB1 may enable the UE 115 to receive SIB2. SIB2 may contain RRC configuration information related to random access channel (RACH) procedures, paging, Physical Uplink Control Channel (PUCCH), Physical Uplink Shared Channel (PUSCH), power control, Sounding Reference Signal (SRS), and cell barring.

The PBCH may also indicate a channel configuration, which may enable the UE 115 to perform a RACH procedure. The channel configuration may include a time and frequency resource configuration of a shared traffic channel (e.g., Physical Downlink Shared Channel (PDSCH) or PUSCH). In some cases, the UE 115 may identify resources for data transmission based on an index of a control channel transmission. In some cases, there may be a predetermined delay between control channel transmissions and data channel transmissions. In some deployments, a narrowband CIoT system may have a coverage area that overlaps with a wideband OFDMA system. The tone spacing of the narrowband CIoT system may be selected such that the tone spacing of the wideband OFDMA system is an integer multiple of the tone spacing of the CIoT system. Such a configuration may provide a group of tones that have reduced interference with tones of the wideband OFDMA system relative to other of the tones.

Figure 2:
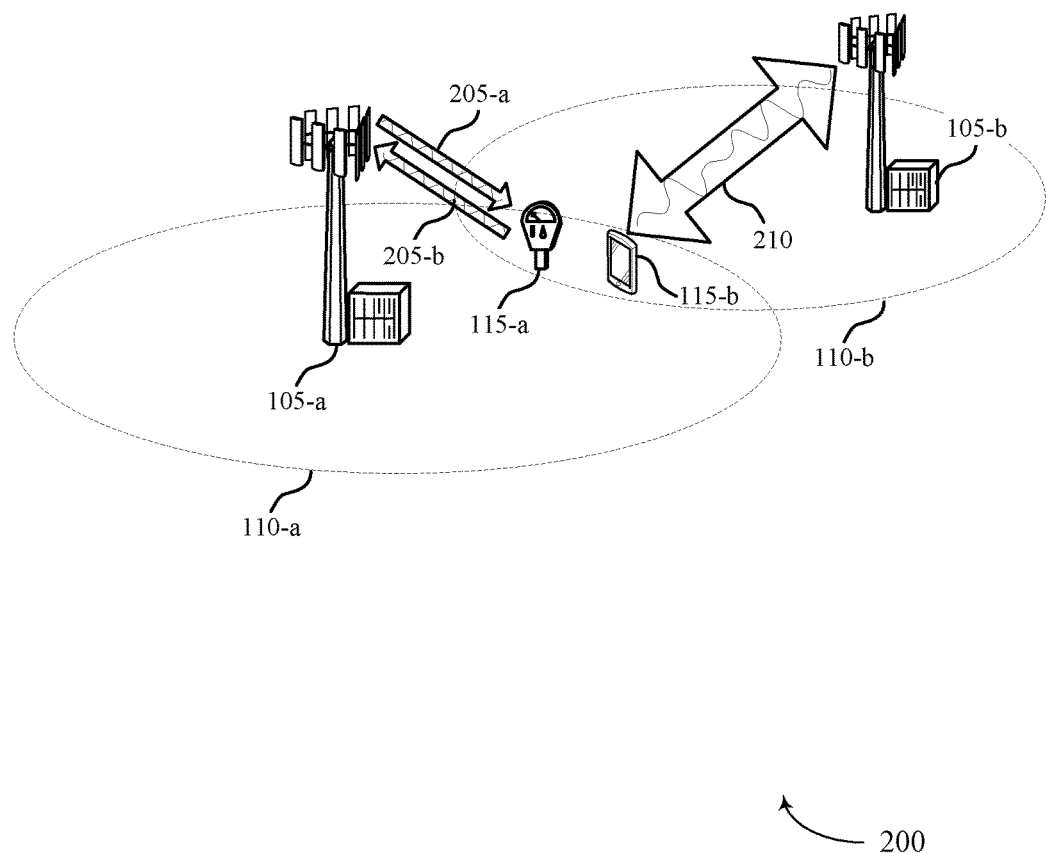
FIG. 2 illustrates an example of a wireless communications subsystem for allocation of frequency resources for a CIoT system in accordance with various aspects of the present disclosure.

FIG. 2 illustrates an example of a wireless communications subsystem 200 for allocation of frequency resources for a CIoT system in accordance with various aspects of the present disclosure. Wireless communications subsystem 200 may include UEs 115-a and 115-b, which may be examples of a UE 115 described above with reference to FIG. 1. Wireless communications subsystem 200 may also include base stations 105-a and 105-b, which may be examples of a base station 105 described above with reference to FIG. 1. Base stations 105-a and 105-b may have coverage areas 110-a and 110-b, respectively, which may overlap, and which may be examples of coverage area 110 described with reference to FIG. 1. Base stations 105-a and 105-b may be adjacent and at least partially overlapping narrowband CIoT and wideband OFDMA systems, respectively.

UE 115-a may communicate with base station 105-a via an uplink and downlink, as described above in FIG. 1. For example, downlink transmissions 205-a may be OFDMA transmissions that are transmitted by base station 105-a to UE 115-a using narrowband communications having a 200 kHz bandwidth divided into a first set of N equally spaced tones (e.g., N=72 tones spaced by 2.5 kHz). Uplink transmissions 205-b may be single carrier frequency division multiple access (SC-FDMA) that utilize the same bandwidth as the downlink transmissions 205-a. UE 115-b may communicate with base station 105-a using bidirectional uplink and downlink transmissions 210, also as described above in FIG. 1. For example, uplink and downlink transmissions 210 may be transmitted using wideband communications having a 1.4-20 MHz bandwidth divided into a second set of equally spaced tones (e.g., tones spacing of 15 kHz). Communications between UE 115-a and base station 105-a, and UE 115-b and base station 105-b, may be time synchronized, although even if the two systems are not completely synchronized in time, various techniques described herein can provide benefits in reducing the interference from some high power narrowband tones to the wideband OFDMA system.

In some examples, both base station 105-a and base station 105-b use an OFDMA-based design, in which the available downlink/uplink bandwidth is divided in to N equally spaced tones. Base station 105-a, operating in a CIoT system may, as described above, utilize a narrowband bandwidth of 200 kHz, using N=72 tones having a tone spacing of 2.5 kHz. Base station 105-a may allocate, in some examples, different tones to different UEs, such as UE 115-a, based on the needs of the particular device. The tone spacing of base station 105-b, in examples, may be an integer (m) multiple of the narrowband tone spacing of base station 105-a (e.g., 15 kHz). The distance between the frequency carriers of base stations 105-a and base station 105-b may be an integer (K) multiple of the NB-OFDMA tone spacing. In such a manner, one out of every m narrowband tones provides relatively low interference with wideband tones. These tones with relatively low interference may be placed into a first group of tones, and may support a higher transmit power than the remaining tones due to the lack of interference with wideband tones between base station 105-b and UE 115-b. If UE 115-a has poor channel conditions resulting in a relatively high path loss, tones of the first group of tones may be used to provide more reliable communications with UE 115-*a*. The remaining tones, representing a second group of tones, may be dynamically allocated to other devices with a smaller path loss which in return may use lower transmit power. In some examples, transmissions using the first group of tones may employ frequency hopping (using different tones over subsequent time slots) to get some interference averaging effect and further enhance reliability of transmissions.

With reference now to FIG. 3A, a frequency domain example 300 of tone spacing for adjacent wideband and narrowband OFDMA systems is discussed, in accordance with various aspects of the present disclosure. Frequency domain tone spacing 300 may be used by UEs 115 to communicate with a base station 105, as described above with reference to FIG. 1 or 2. In this example, wideband tones 310 may have a tone spacing $D_1$, which may be equal to m times a narrowband tone spacing $D_2$ between $m^{th}$ narrowband tones 315 and narrowband tones 320. Furthermore, a distance $D_3$ between the central frequency carriers of the wideband and narrowband OFDMA systems is an integer (k) multiple of the narrowband tone spacing $D_2$ (i.e., $D_3=kD_2$). In such a manner, every $m^{th}$ narrowband tone 315 will cause little or no interference on the adjacent wideband tones 310, and may be grouped together to provide a first group of $m^{th}$ narrowband tones 315 that have relatively little interference with the wideband tones 310. The remaining narrowband tones 320 may likewise be grouped together to provide a second group of narrowband tones 320 that have relatively higher interference with wideband tones 310. Because the first group of $m^{th}$ narrowband tones 315 have relatively little interference, transmission power using the first group of tones may be relatively high. Likewise, because the second group of tones have relatively higher interference with wideband tones 310, transmission power using the second group of times may be relatively low, in order to mitigate such interference.

The higher power transmissions of the first group of $m^{th}$ narrowband tones 315 may be used for communication with devices having relatively high path loss, or for communications that may have relatively low latency requirements (e.g., high priority communications as opposed to best-efforts communications). The lower power transmissions of the second group of narrowband tones 320 may be used for communication with devices having lower path loss and/or communications having less stringent latency requirements. Multiple various coding blocks with potentially different powers, each corresponding to one device, may be transmitted over the second group of narrowband tones 320, according to various examples.

The transmissions using the first group of $m^{th}$ narrowband tones 315 or second group of narrowband tones 320 may be either downlink or uplink transmissions. In some examples, interference may further be mitigated through the use of frequency hopping techniques, in which a subset of $m^{th}$ narrowband tones 315 allocated to each coding block transmitted to/by each device may change over the duration of its transmission. The $m^{th}$ narrowband tones 315 in such examples are tones in the first group, and such techniques may provide frequency diversity in the transmission of each coding block.

FIG. 3B illustrates a time domain example 350 of locations of symbols transmitted in a CIoT system and an adjacent wireless communications system in accordance with various aspects of the present disclosure. Symbols 355 for a narrowband CIoT system, and symbols 360 of a wideband OFDMA system may be used by UEs 115 to communicate with a base station 105, as described above with reference to FIG. 1 or 2. According to various examples, the symbol duration of symbols 360 of the wideband OFDMA system may be a factor of m shorter than a symbol duration of symbols 355 of the narrowband CIoT system.

Figure 4:
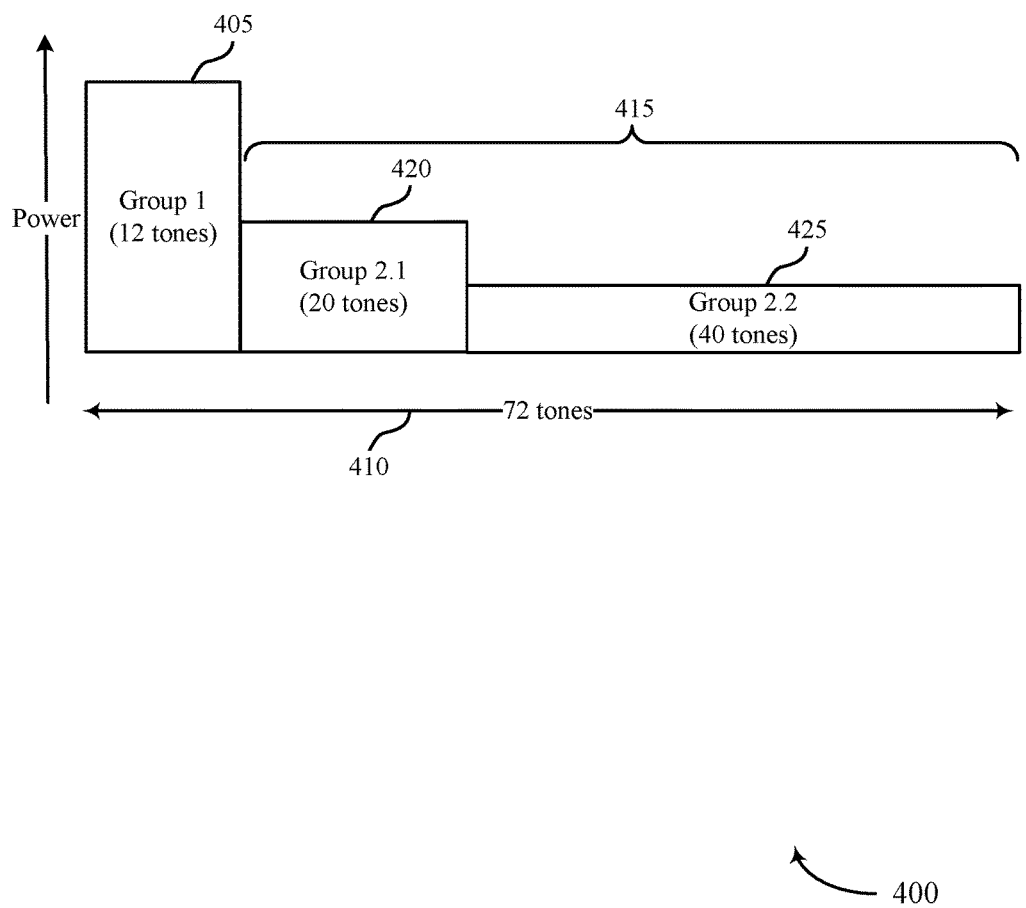
FIG. 4 illustrates an example of tone groupings for allocation of frequency resources for a CIoT system in accordance with various aspects of the present disclosure.

FIG. 4 illustrates an example 400 of transmission power for different groups of tones of a narrowband CIoT system in accordance with various aspects of the present disclosure. Groups of tones for a narrowband CIoT system may be used by UEs 115 to communicate with a base station 105, as described above with reference to FIG. 1 or 2. In the example of FIG. 4, a first group of tones 405 may be identified as including every $m^{th}$ tone in a set of tones 410, as discussed above. A second group of tones 415 may be identified as remaining tones of the set of tones 410. In some examples, fractional frequency reuse (FFR) techniques may be employed within the second group of tones 415 to identify two or more subsets of the second group of tones 415. In the example of FIG. 4, two subsets of tones 420 and 425 are identified that may use FFR techniques. Such FFR techniques provide that, in a cell, devices may be categorized based on their path loss and required downlink/uplink transmit power, and then allocated to different subgroups. In this example, group 2.1 420 may include 20 tones that are transmitted using a transmission power that is less than the transmission power for the first group of tones 405. Further, group 2.2 425 may include 40 tones that are transmitted using a transmission power that is less than the transmission power for group 2.1 420.

Figure 5:
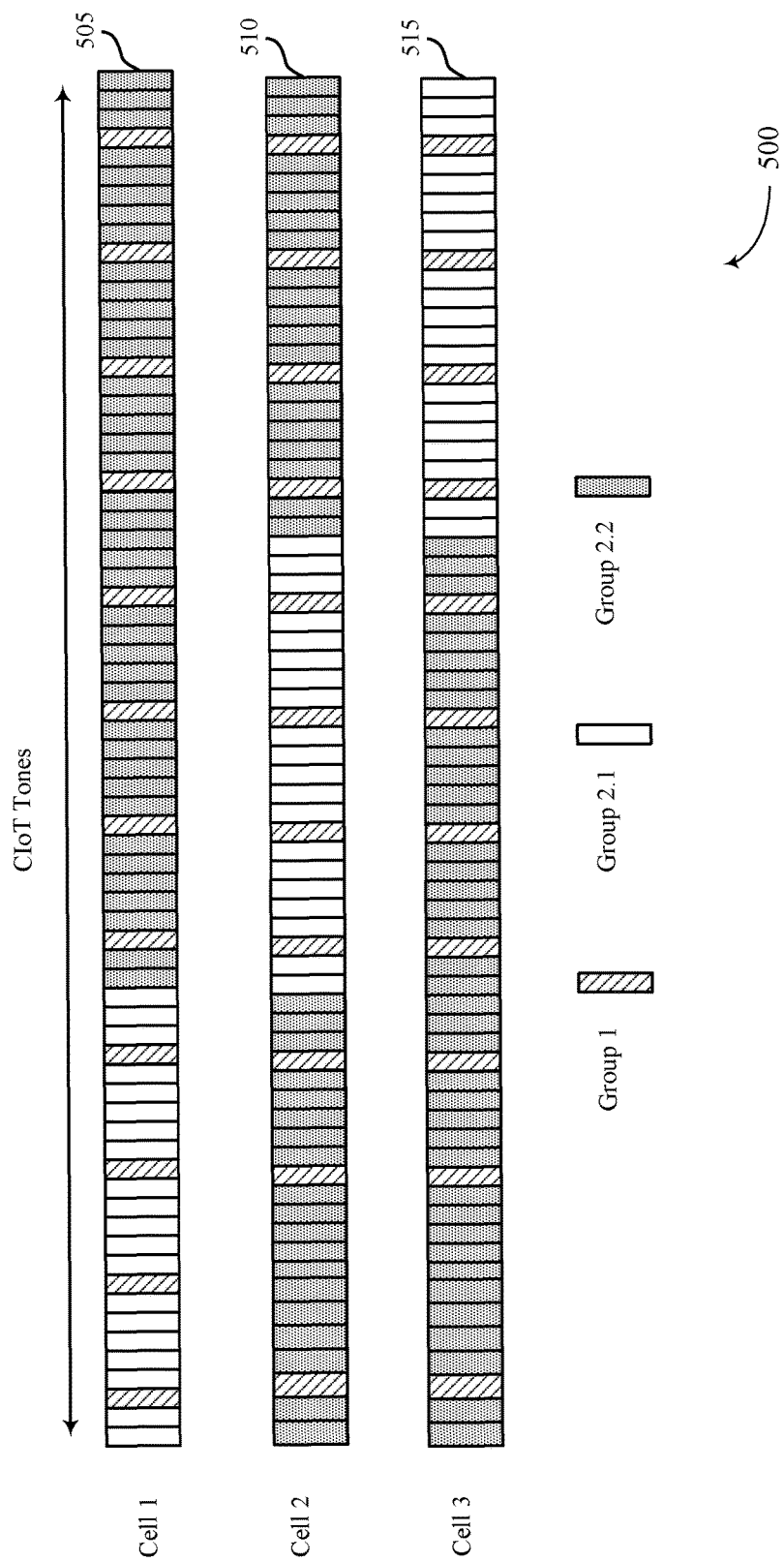
FIG. 5 illustrates an example of a downlink tone allocation across neighboring cells for a CIoT system in accordance with various aspects of the present disclosure.

FIG. 5 illustrates an example 500 of subgroup allocations across neighboring cells of a narrowband CIoT system in accordance with various aspects of the present disclosure. In some examples, subgroup allocations may be different across neighboring cells to benefit from interference averaging. Groups of tones for a narrowband CIoT system may be used by UEs 115 to communicate with base stations 105 of neighboring cells, as described above with reference to FIG. 1 or 2. In the example of FIG. 5, three neighboring cells may transmit CIoT tones, with a first cell transmitting tones 505, a second cell transmitting tones 510, and a third cell transmitting tones 515. Each cell may group tones in a manner such as discussed above, in which group 1 may include tones which have reduced interference with wideband tones. Group 2.1 may be identified as discussed above, and the tones allocated to this subgroup may be selected such that the selection of tones for this subgroup are orthogonal amongst neighboring cells. Group 2.2 also may be identified as discussed above, and the remaining tones for each cell may be allocated to this subgroup. As discussed above, the different groups of tones may have different transmission powers. In one example, Group 1 may include 12 tones that provide for transmissions using a very high transmit power of more than 28 dBm/tone, group 2.1 may include 20 tones that provide for transmissions using a high transmit power of about 25 dBm/tone, and group 2.2 may include 40 tones that provide for transmissions using relatively low power of less than 20 dBm/tone. Of course, these examples are but one of numerous examples as will be readily recognized by one of skill in the art.

Figure 6:
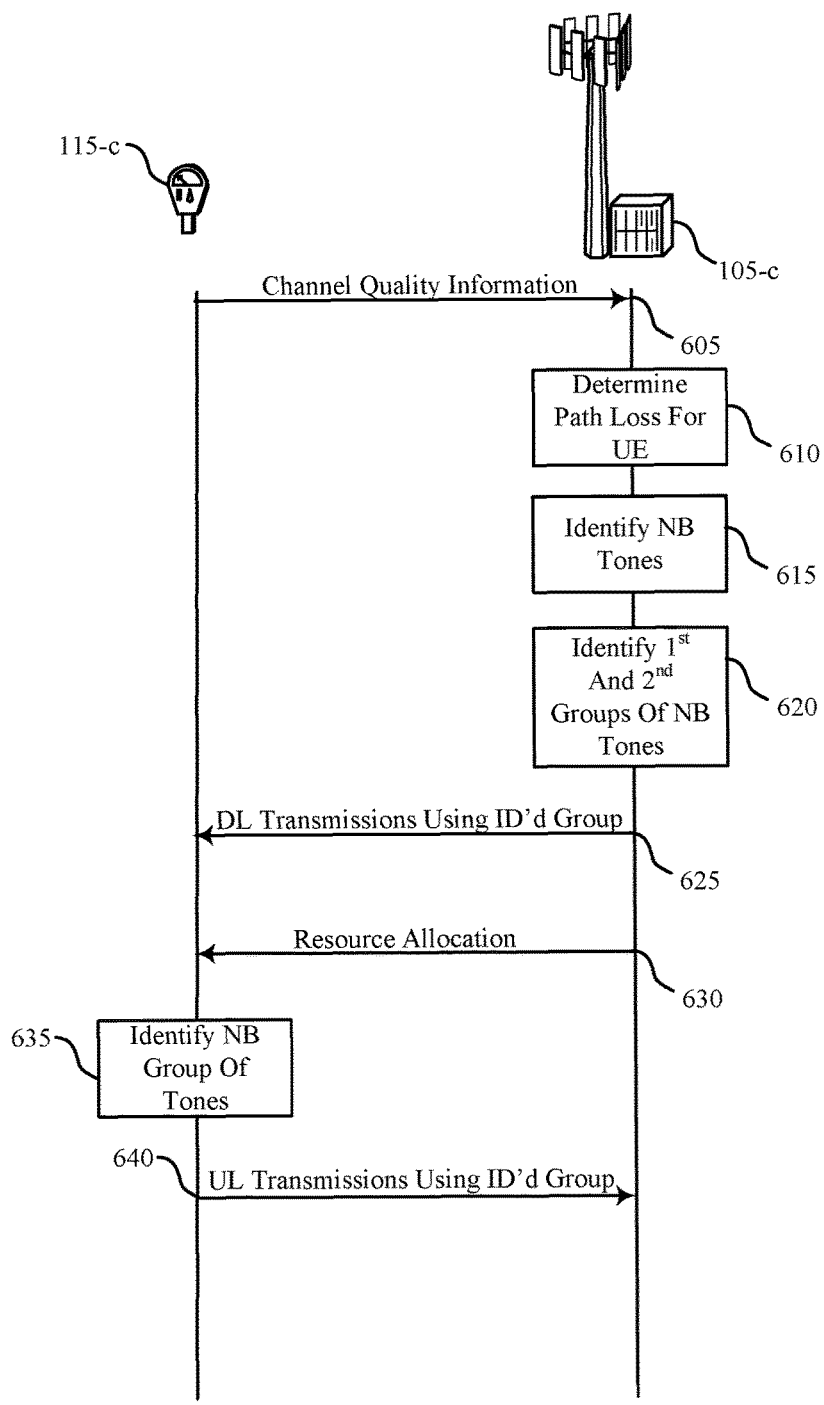
FIG. 6 illustrates an example of a process flow diagram for allocation of frequency resources for a CIoT system in accordance with various aspects of the present disclosure.

FIG. 6 illustrates an example of a process flow diagram 600 for allocation of frequency resources for a CIoT system in accordance with various aspects of the present disclosure. Process flow diagram 600 for resource allocation may include a UE 115-*c*, which may be an example of a UE 115 described above with reference to FIGS. 1 and 2. Process flow diagram 600 for resource allocation may also include base station 105-*c*, which may be an example of a base station 105 described above with reference to FIGS. 1 and 2.

At step 605, UE 115-*c* may transmit channel quality information to base station 105-*c*, which may be used to determine a path loss for UE 115-*a* at step 610. At step 615, base station 105-*c* may identify narrowband tones for use in CIoT transmissions. At step 620, base station 105-*c* may identify first and second groups of tones, in a similar manner as discussed above. The base station 105-*c* may transmit downlink transmissions 625 using the identified group of tones for UE 115-*c*. Base station 105-*c* also may transmit resource allocation 630 to UE 115-*c*. The resource allocation 630 may provide an identification of tones that the UE 115-*c* is to use for transmissions. For example, the base station 105-*c* may determine that the UE 115-*c* has a relatively high path loss that warrants higher power transmissions, and may identify that tones from the first group of tones are to be used for UE 115-*c* uplink transmissions. Likewise, if the base station 105-*c* determines that the UE 115-*c* has a relatively low path loss (or that the communications do not have stringent latency requirements), the base station may identify tones from the second group of tones for UE 115-*c* uplink transmissions. At step 635, UE 115-*c* may identify a narrowband group of tones for uplink transmissions, and may transmit uplink transmissions 640 using the identified group of tones.

Figure 7:
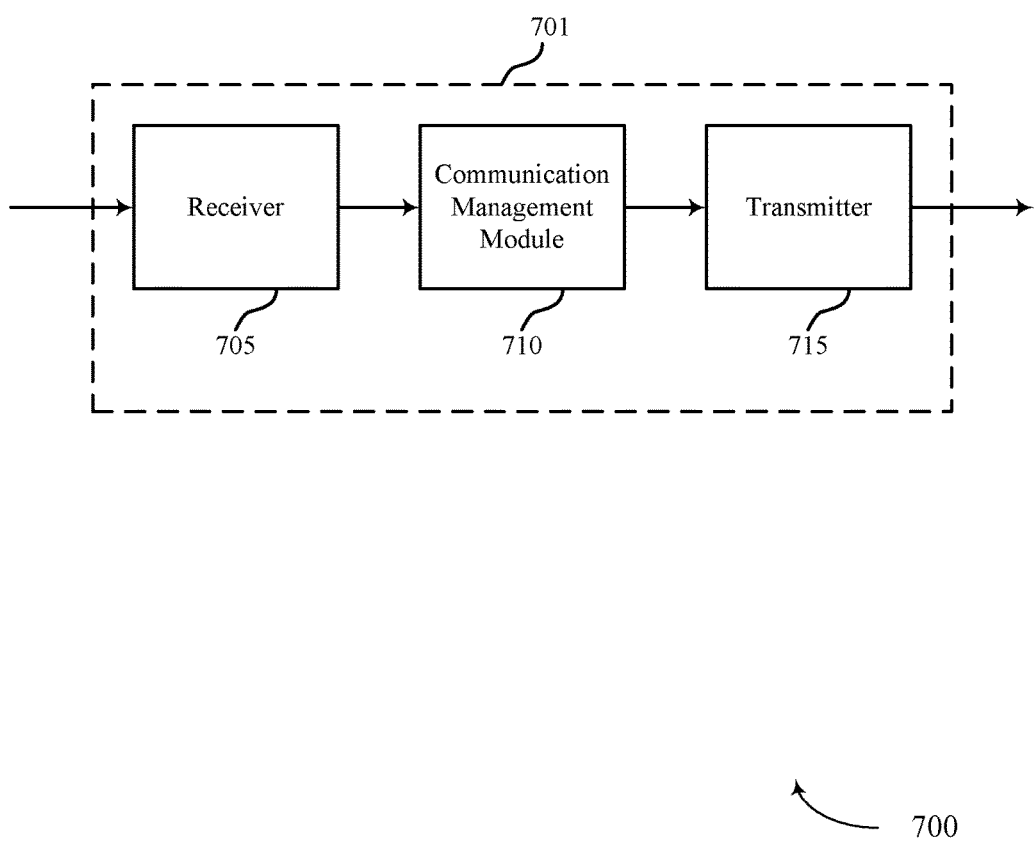
FIG. 7 shows a block diagram of device configured for allocation of frequency resources for a CIoT system in accordance with various aspects of the present disclosure.

FIG. 7 shows a block diagram 700 of a device 701 configured for allocation of frequency resources for a CIoT system in accordance with various aspects of the present disclosure. Device 701 may be an example of aspects of a UE 115 or base station 105 described with reference to FIGS. 1-6. Device 701 may include a receiver 705, a communication management module 710, and/or a transmitter 715. Device 701 may also include a processor. Each of these components may be in communication with each other.

The receiver 705 may receive information such as packets, user data, and/or control information associated with various information channels (e.g., control channels, data channels, and information related to allocation of frequency resources for a CIoT system, etc.). Information may be passed on to the communication management module 710, and to other components of device 701. In some examples, the receiver 705 may receive communications of a group of tones identified for communications between a UE 115 and a base station 105.

The communication management module 710 may receive communications on one or more groups of tones and may manage communications on one or more groups of tones of a narrowband CIoT system, using techniques as discussed above. The transmitter 715 may transmit signals received from other components of device 701. In some examples, the transmitter 715 may be collocated with the receiver 705 in a transceiver module. The transmitter 715 may include a single antenna, or it may include a plurality of antennas. In some examples, the transmitter 715 may transmit an uplink signal with the generated uplink carrier frequency. In some examples, the transmitter 715 may transmit the data channel transmission on the time frequency resource of the shared data traffic channel. In some examples, the transmitter 715 may be put into a low power mode during a sleep interval and then powered up to transmit a data channel transmission upon expiration of a sleep wake up timer.

Figure 8:
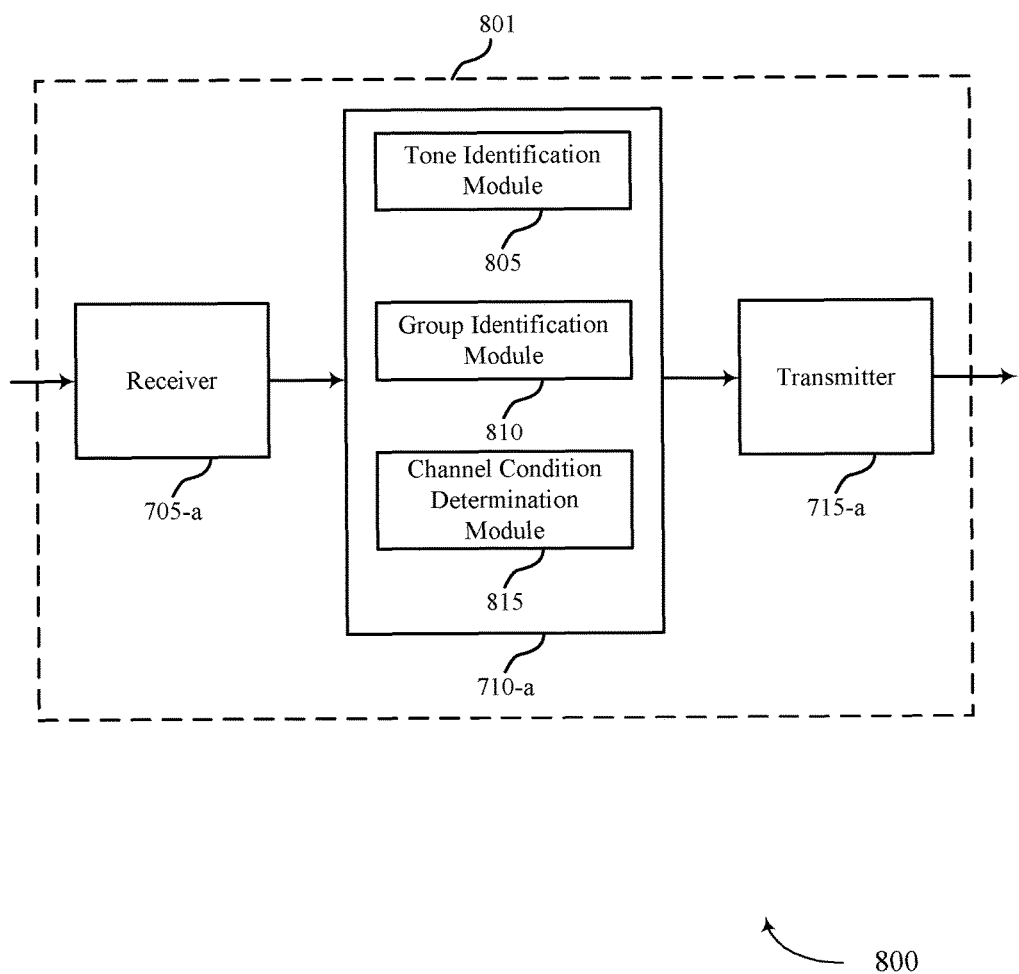
FIG. 8 shows a block diagram of a device configured for allocation of frequency resources for a CIoT system in accordance with various aspects of the present disclosure.

FIG. 8 shows a block diagram 800 of a device 801 for allocation of frequency resources for a CIoT system in accordance with various aspects of the present disclosure. Device 801 may be an example of aspects of a UE 115 or base station described with reference to FIGS. 1-6, or aspects of device 701 of FIG. 7. Device 801 may include a receiver 705-*a*, a communication management module 710-*a*, or a transmitter 715-*a*. Device 801 may also include a processor. Each of these components may be in communication with each other. The communication management module 710-*a* may also include a tone identification module 805, a group identification module 810, and a channel condition determination module 815.

The receiver 705-*a* may receive information which may be passed on to the communication management module 710-*a*, and to other components of device 801. The communication management module 710-*a* may perform the operations described above with reference to FIG. 7. The transmitter 715-*a* may transmit signals received from other components of device 801.

The tone identification module 805 may identify narrowband tones for use in communications in a narrowband CIoT, as described above with reference to FIGS. 2-6. The group identification module 810 may determine different available groups of tones for transmissions in a narrowband CIoT, the different groups of tones having an associated available transmit power, as described above with reference to FIGS. 2-6. The group identification module 810 may also determine one or more subsets of a group of tones that may be used for FFR techniques. The channel condition determination module 815 may determine channel conditions associated with a particular UE, and may determine a path loss associated with a UE based at least in part on channel conditions of the UE, as described above with reference to FIGS. 2-6.

Figure 9:
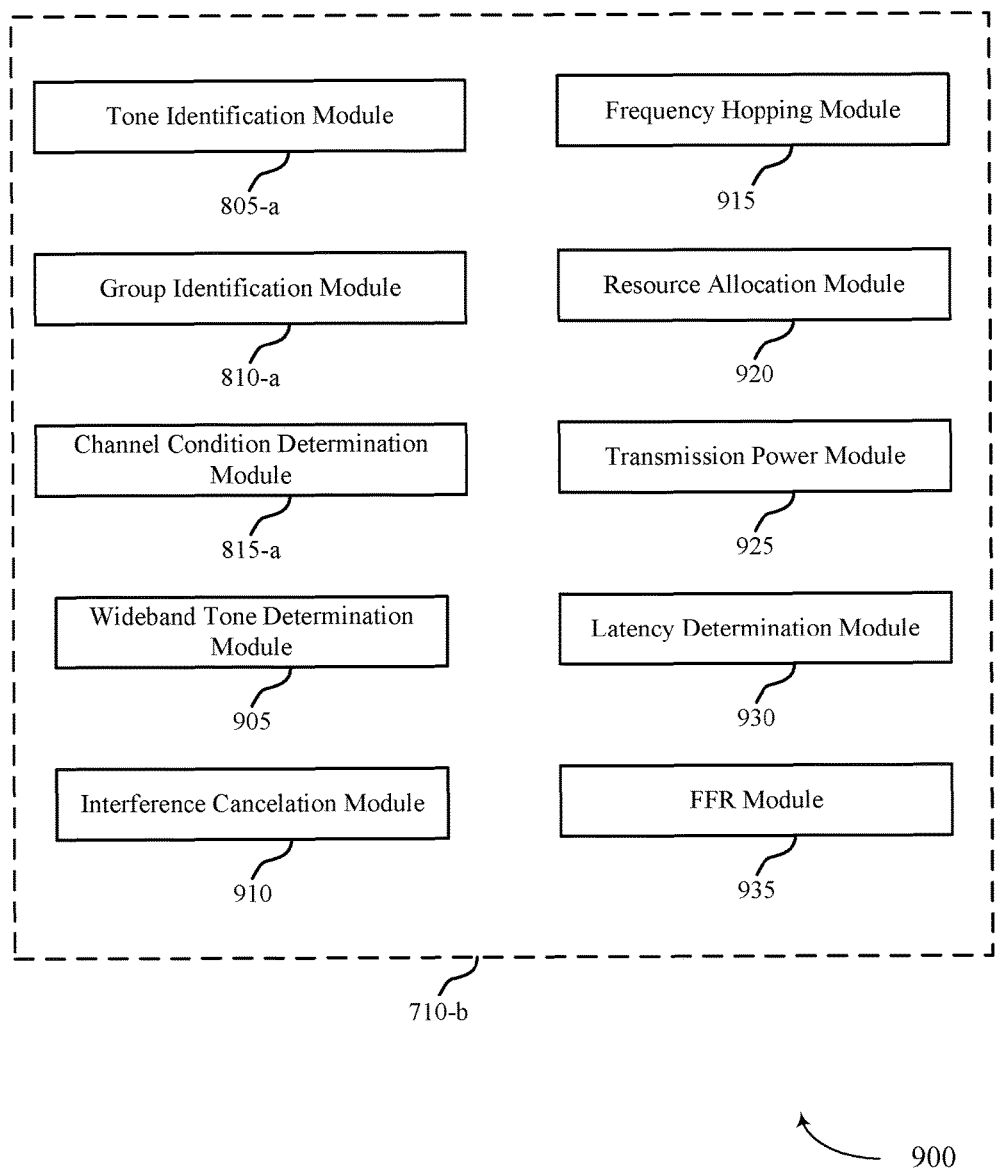
FIG. 9 shows a block diagram of a communication management module configured for allocation of frequency resources for a CIoT system in accordance with various aspects of the present disclosure.

FIG. 9 shows a block diagram 900 of a communication management module 710-*b* for allocation of frequency resources for a CIoT system in accordance with various aspects of the present disclosure. The communication management module 710-*b* may be an example of aspects of a communication management module 710 described with reference to FIGS. 7-8. The communication management module 710-*b* may include a tone identification module 805-*a*, a group identification module 810-*a*, and a channel condition determination module 815-*a*. Each of these modules may perform the functions described above with reference to FIG. 8. The communication management module 710-*b* may also include a wideband tone determination module 905, an interference cancellation module 910, a frequency hopping module 915, a resource allocation module 920, a transmission power module 925, a latency determination module 930, or a FFR module 935.

The wideband tone determination module 905 may identify tone characteristics of one or more neighboring wideband wireless communications systems as described above with reference to FIGS. 2-6. The interference cancellation module 910 may perform interference suppression or interference cancellation techniques on transmissions over a narrowband CIoT system as described above with reference to FIGS. 2-6. The frequency hopping module 915 may perform frequency hopping techniques for transmissions on a group of tones to provide one or more of frequency diversity or interference averaging for the transmissions, as described above with reference to FIGS. 2-6. The resource allocation module 920 may determine resources that are to be used for narrowband CIoT transmissions as described above with reference to FIGS. 2-6. The resource allocation module 920 may also determine resources to be used by a UE 115 for transmissions in examples where the communication management module 710-*b* is included as part of a base station. The transmission power module 925 may determine a transmission power for transmissions on identified tones of a narrowband CIoT system as described above with reference to FIGS. 2-6.

The latency determination module 930 may determine a latency associated with data that is to be transmitted to or from a UE, which may be used to help identify a group of tones that are to be used for transmitting the data, as described above with reference to FIGS. 2-6. The FFR module 935 may perform FFR techniques for interference averaging and frequency diversity within a group of tones as described above with reference to FIGS. 2-6.

Figure 10:
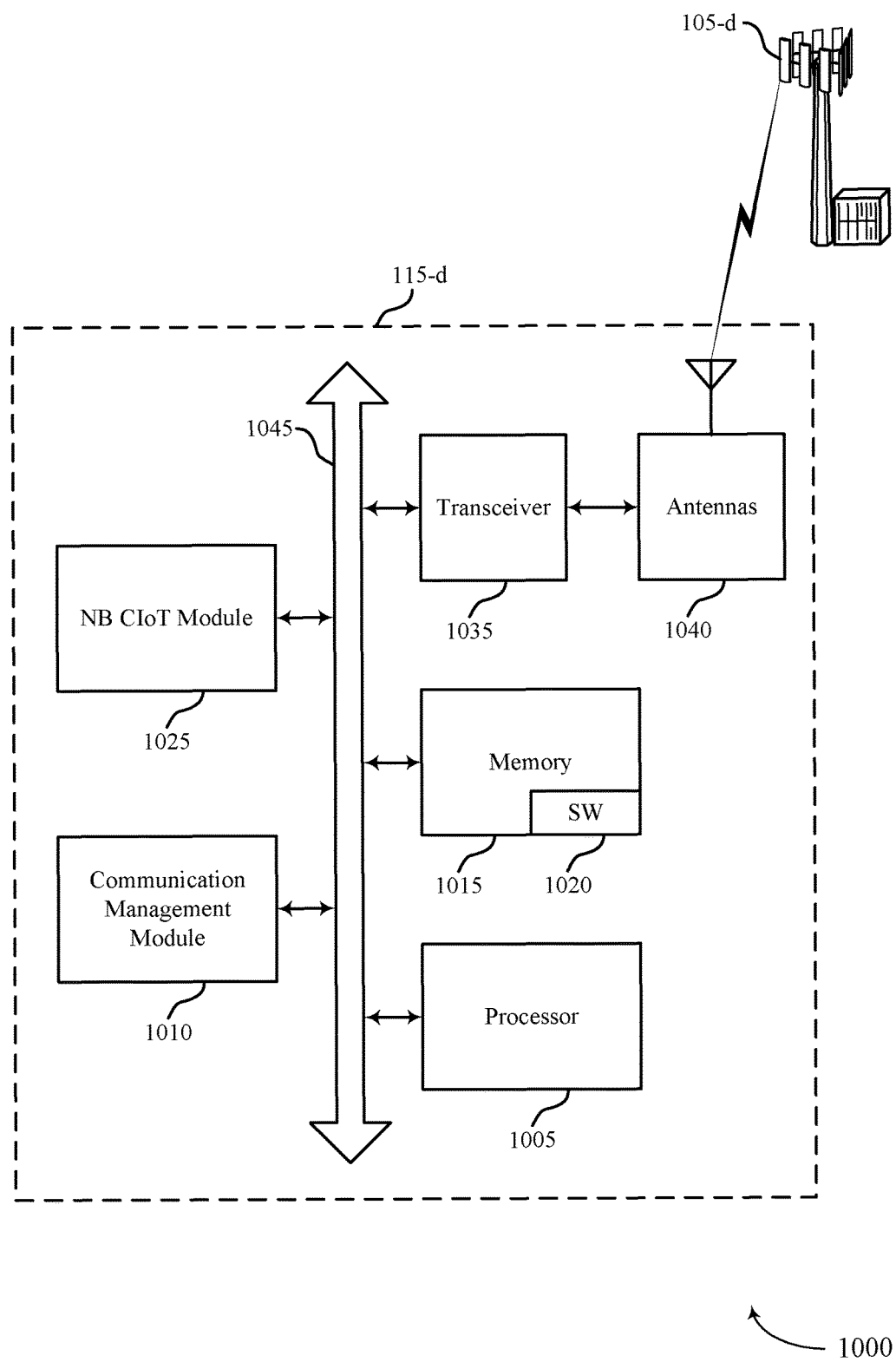
FIG. 10 illustrates a block diagram of a system including a UE configured for allocation of frequency resources for a CIoT system in accordance with various aspects of the present disclosure.

FIG. 10 shows a diagram of a system 1000 including a UE 115-*d* configured for allocation of frequency resources for a CIoT system in accordance with various aspects of the present disclosure. System 1000 may include UE 115-*d*, which may be an example of a UE 115 or device 701 or 801 described above with reference to FIGS. 1-9. UE 115-*d* may include a communication management module 1010, which may be an example of a communication management module 710 described with reference to FIGS. 7-9. UE 115-*d* may also include a narrowband CIoT module 1025. UE 115-*d* may also include components for bi-directional voice or data communications including components for transmitting communications and components for receiving communications. For example, UE 115-*d* may communicate bi-directionally with base station 105-*f*.

The narrowband CIoT module 1025 may exchange data with a network based on MTC procedures or narrowband IoT procedures as described above with reference to FIGS. 2-6. For example, the narrowband CIoT module 1025 may facilitate improved communication between the UE 115-*d* and a base station 105-*f* by using groups of tones from a set of narrowband tones that support transmissions on different power levels. In other examples of MTC procedures, UE 115-*d* may utilize OFDMA for demodulating downlink messages and SC-FDMA for uplink modulation.

The UE 115-*d* may also include a processor module 1005, and memory 1015 (including software (SW)) 1020, a transceiver module 1035, and one or more antenna(s) 1040, each of which may communicate, directly or indirectly, with each other (e.g., via buses 1045). The transceiver module 1035 may communicate bi-directionally, via the antenna(s) 1040 and/or wired or wireless links, with one or more networks, as described above. For example, the transceiver module 1035 may communicate bi-directionally with a base station 105 and/or another UE 115. The transceiver module 1035 may include a modem to modulate the packets and provide the modulated packets to the antenna(s) 1040 for transmission, and to demodulate packets received from the antenna(s) 1040. While UE 115-*d* may include a single antenna 1040, UE 115-*d* may also have multiple antennas 1040 capable of concurrently transmitting and/or receiving multiple wireless transmissions.

The memory 1015 may include random access memory (RAM) and read only memory (ROM). The memory 1015 may store computer-readable, computer-executable software/firmware code 1020 including instructions that, when executed, cause the processor module 1005 to perform various functions described herein (e.g., allocation of frequency resources for a CIoT system, etc.). Alternatively, the software/firmware code 1020 may not be directly executable by the processor module 1005 but cause a computer (e.g., when compiled and executed) to perform functions described herein. The processor module 1005 may include an intelligent hardware device, (e.g., a central processing unit (CPU), a microcontroller, an ASIC, etc.)

Figure 11:
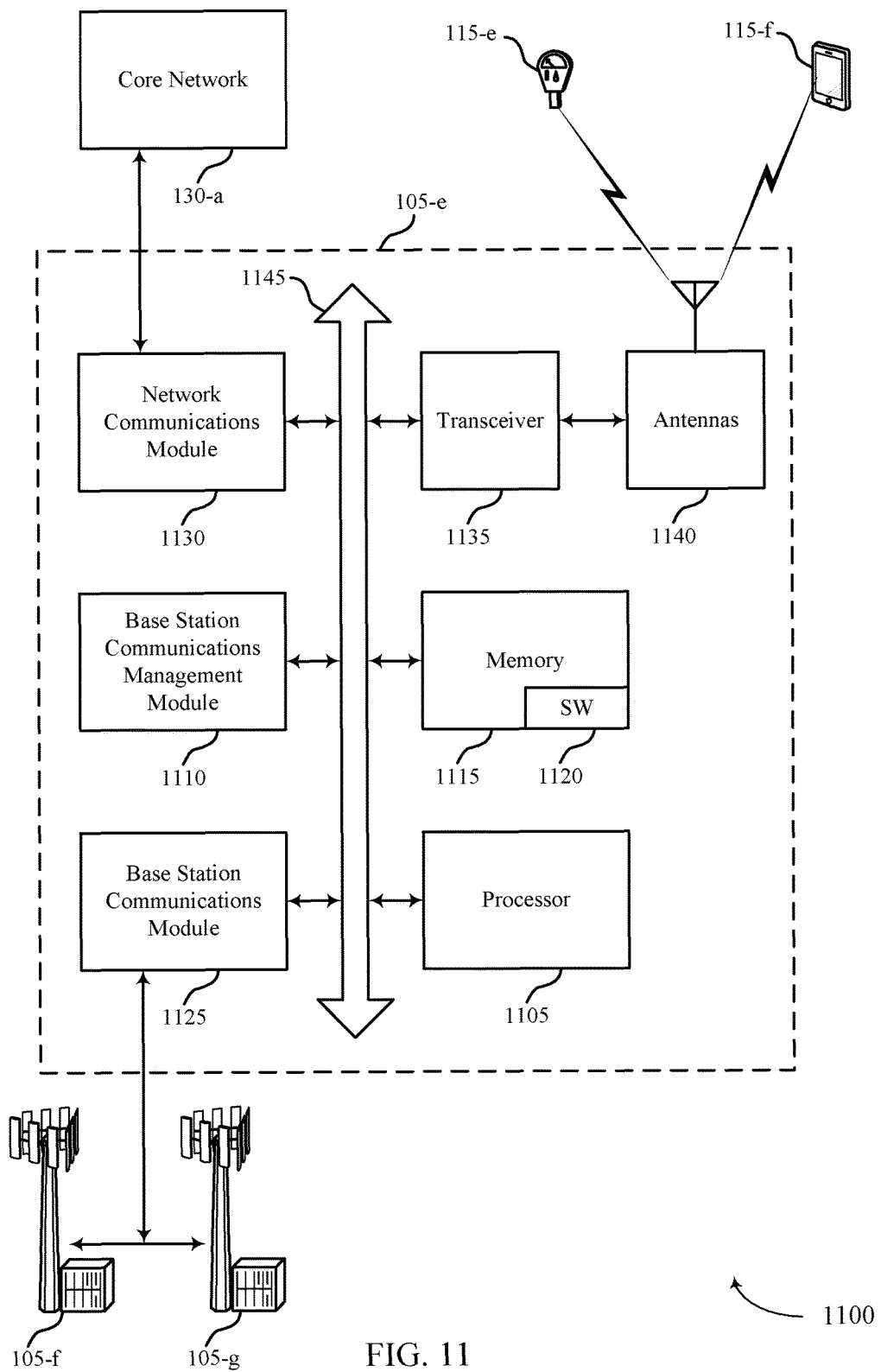
FIG. 11 illustrates a block diagram of a system including a base station configured for allocation of frequency resources for a CIoT system in accordance with various aspects of the present disclosure.

FIG. 11 shows a diagram of a system 1100 including a base station 105 configured for allocation of frequency resources for a CIoT system in accordance with various aspects of the present disclosure. System 1100 may include base station 105-*e*, which may be an example of a device 701, a device 801, or a base station 105 as described above with reference to FIGS. 1-9. Base Station 105-*e* may include a base station communications management module 1110, which may be an example of a communication management module 710 described with reference to FIGS. 7-9. Base Station 105-*e* may also include components for bi-directional voice and data communications including components for transmitting communications and components for receiving communications. For example, base station 105-*e* may communicate bi-directionally with UE 115-*e* (which may be an MTC or CIoT device) or UE 115-*f*.

In some cases, base station 105-*e* may have one or more wired backhaul links. Base station 105-*e* may have a wired backhaul link (e.g., S1 interface, etc.) to the core network 130. Base station 105-*e* may also communicate with other base stations 105, such as base station 105-*f* and base station 105-*g* via inter-base station backhaul links (e.g., an X2 interface). Each of the base stations 105 may communicate with UEs 115 using the same or different wireless communications technologies. In some cases, base station 105-*e* may communicate with other base stations such as 105-*f* or 105-*g* utilizing base station communication module 1125. In some embodiments, base station communication module 1125 may provide an X2 interface within an LTE/LTE-A wireless communication network technology to provide communication between some of the base stations 105. In some embodiments, base station 105-*e* may communicate with other base stations through core network 130. In some cases, base station 105-*e* may communicate with the core network 130 through network communications module 1130.

The base station 105-*e* may include a processor module 1105, memory 1115 (including software (SW) 1120), transceiver modules 1135, and antenna(s) 1140, which each may be in communication, directly or indirectly, with one another (e.g., over bus system 1145). The transceiver modules 1135 may be configured to communicate bi-directionally, via the antenna(s) 1140, with the UEs 115, which may be multi-mode devices. The transceiver module 1135 (or other components of the base station 105-*e*) may also be configured to communicate bi-directionally, via the antennas 1140, with one or more other base stations (not shown). The transceiver module 1135 may include a modem configured to modulate the packets and provide the modulated packets to the antennas 1140 for transmission, and to demodulate packets received from the antennas 1140. Base station 105-*e* may include multiple transceiver modules 1135, each with one or more associated antennas 1140. The transceiver module may be an example of a combined receiver and transmitter of FIG. 6.

The memory 1115 may include RAM and ROM. The memory 1115 may also store computer-readable, computer-executable software code 1120 containing instructions that are configured to, when executed, cause the processor module 1110 to perform various functions described herein (e.g., allocation of frequency resources for a CIoT system, etc.). Alternatively, the software code 1120 may not be directly executable by the processor module 1105 but may be configured to cause the computer (e.g., when compiled and executed) to perform functions described herein. The processor module 1105 may include an intelligent hardware device (e.g., a CPU, a microcontroller, an ASIC, etc.). The processor module 1105 may include various special purpose processors such as encoders, queue processing modules, base band processors, radio head controllers, digital signal processor (DSPs), and the like.

The base station communication module 1125 may manage communications with other base stations 105. The communications management module may include a controller or scheduler for controlling communications with UEs 115 in cooperation with other base stations 105. For example, the base station communication module 1125 may coordinate scheduling for transmissions to UEs 115 for various interference mitigation techniques such as beamforming or joint transmission.

Figure 12:
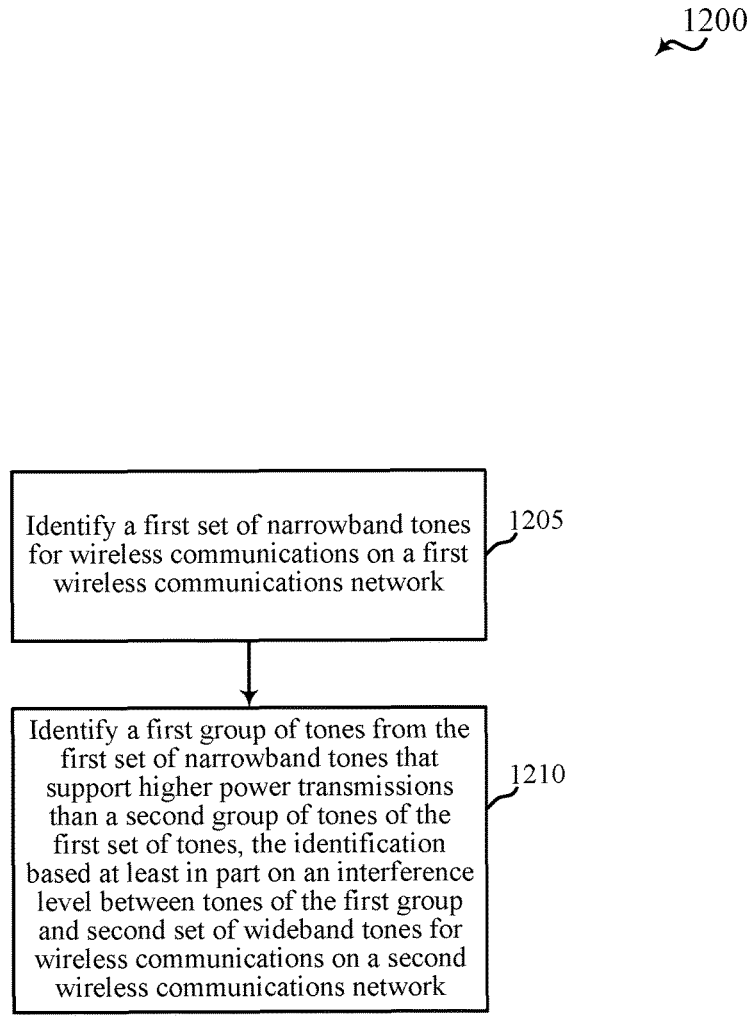
FIG. 12 shows a flowchart illustrating a method for allocation of frequency resources for a CIoT system in accordance with various aspects of the present disclosure.

FIG. 12 shows a flowchart illustrating a method 1200 for allocation of frequency resources for a CIoT system in accordance with various aspects of the present disclosure. The operations of method 1200 may be implemented by a UE 115 or its components as described with reference to FIGS. 1-10, by a base station 105 or its components as described with reference to FIGS. 1-11, or by a device 701 or 801 described with reference to FIG. 7 or 8. For example, the operations of method 1200 may be performed by the communication management module 710 as described with reference to FIGS. 7-11. In some examples, a UE 115 or base station 105 may execute a set of codes to control the functional elements of the UE 115 or base station 105 to perform the functions described below. Additionally or alternatively, the UE 115 or base station may perform aspects of the functions described below using special-purpose hardware.

At block 1205, the method 1200 includes identifying a first set of narrowband tones for wireless communications on a first wireless communications network as described above with reference to FIGS. 2-6. In certain examples, the operations of block 1205 may be performed by the tone identification module 805 as described above with reference to FIGS. 8-9.

At block 1210, the method 1200 may include identifying a first group of tones from the first set of narrowband tones that support higher power transmissions than a second group of tones of the first set of tones, the identification based at least in part on an interference level between tones of the first group and second set of wideband tones for wireless communications on a second wireless communications network as described above with reference to FIGS. 2-6. In certain examples, the operations of block 1210 may be performed by the group identification module 810 as described above with reference to FIGS. 8-9.

Figure 13:
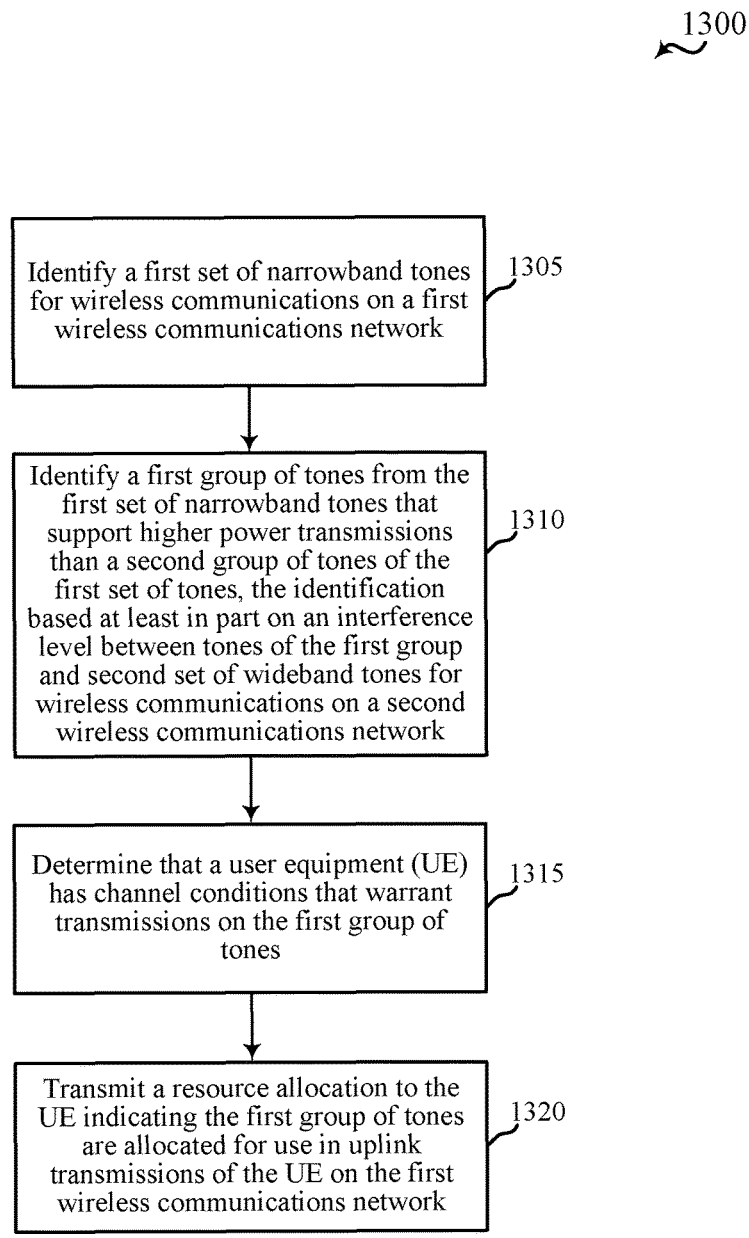
FIG. 13 shows a flowchart illustrating a method for allocation of frequency resources for a CIoT system in accordance with various aspects of the present disclosure.

FIG. 13 shows a flowchart illustrating a method 1300 for allocation of frequency resources for a CIoT system in accordance with various aspects of the present disclosure. The operations of method 1300 may be implemented by a base station 105 or its components as described with reference to FIGS. 1-11, or by a device 701 or 801 described with reference to FIG. 7 or 8. For example, the operations of method 1300 may be performed by the communication management module 710 as described with reference to FIGS. 7-11. In some examples, a base station 105 may execute a set of codes to control the functional elements of the base station 105 to perform the functions described below. Additionally or alternatively, the base station 105 may perform aspects of the functions described below using special-purpose hardware.

At block 1305, the method 1300 includes identifying a first set of narrowband tones for wireless communications on a first wireless communications network as described above with reference to FIGS. 2-6. In certain examples, the operations of block 1305 may be performed by the tone identification module 805 as described above with reference to FIGS. 8-9.

At block 1310, the method 1300 may include identifying a first group of tones from the first set of narrowband tones that support higher power transmissions than a second group of tones of the first set of tones, the identification based at least in part on an interference level between tones of the first group and second set of wideband tones for wireless communications on a second wireless communications network as described above with reference to FIGS. 2-6. In certain examples, the operations of block 1310 may be performed by the group identification module 810 as described above with reference to FIGS. 8-9.

At block 1315, the method 1300 includes determining that a UE has channel conditions that warrant transmissions on the first group of tones as described above with reference to FIGS. 2-6. In certain examples, the operations of block 1315 may be performed by the group identification module 810 or the channel condition determination module 815 as described above with reference to FIGS. 8-9.

At block 1320, the method 1300 includes transmitting a resource allocation to the UE indicating the first group of tones are allocated for use in uplink transmissions of the UE on the first wireless communications network as described above with reference to FIGS. 2-6. In certain examples, the operations of block 1320 may be performed by the group identification module 810 or the resource allocation module 920 as described above with reference to FIGS. 8-9.

Figure 14:
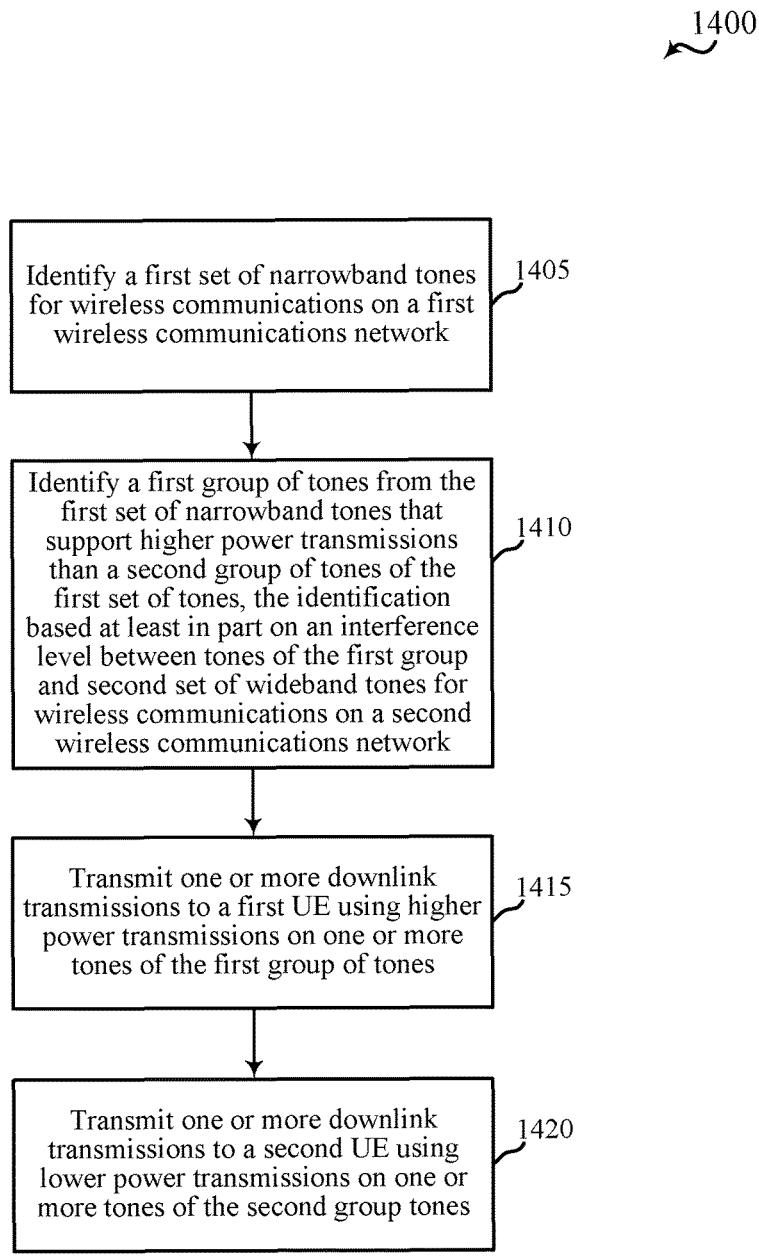
FIG. 14 shows a flowchart illustrating a method for allocation of frequency resources for a CIoT system in accordance with various aspects of the present disclosure.

FIG. 14 shows a flowchart illustrating a method 1400 for allocation of frequency resources for a CIoT system in accordance with various aspects of the present disclosure. The operations of method 1400 may be implemented by a base station 105 or its components as described with reference to FIGS. 1-11, or by a device 701 or 801 described with reference to FIG. 7 or 8. For example, the operations of method 1400 may be performed by the communication management module 710 as described with reference to FIGS. 7-11. In some examples, a base station 105 may execute a set of codes to control the functional elements of the base station 105 to perform the functions described below. Additionally or alternatively, the base station 105 may perform aspects of the functions described below using special-purpose hardware.

At block 1405, the method 1400 includes identifying a first set of narrowband tones for wireless communications on a first wireless communications network as described above with reference to FIGS. 2-6. In certain examples, the operations of block 1405 may be performed by the tone identification module 805 as described above with reference to FIGS. 8-9.

At block 1410, the method 1400 may include identifying a first group of tones from the first set of narrowband tones that support higher power transmissions than a second group of tones of the first set of tones, the identification based at least in part on an interference level between tones of the first group and the second set of wideband tones for wireless communications on a second wireless communications network as described above with reference to FIGS. 2-6. In certain examples, the operations of block 1410 may be performed by the group identification module 810 as described above with reference to FIGS. 8-9.

At block 1415, the method 1400 includes transmitting one or more downlink transmissions to a first UE using higher power transmissions on one or more tones of the first group of tones as described above with reference to FIGS. 2-6. In certain examples, the operations of block 1415 may be performed by the group identification module 810 or the transmitter 715 as described above with reference to FIGS. 7-9.

At block 1420, the method 1400 includes transmitting one or more downlink transmissions to a second UE using lower power transmissions on one or more tones of the second group tones as described above with reference to FIGS. 2-6. In certain examples, the operations of block 1420 may be performed by the group identification module 810 or the transmitter 715 as described above with reference to FIGS. 7-9.

Figure 15:
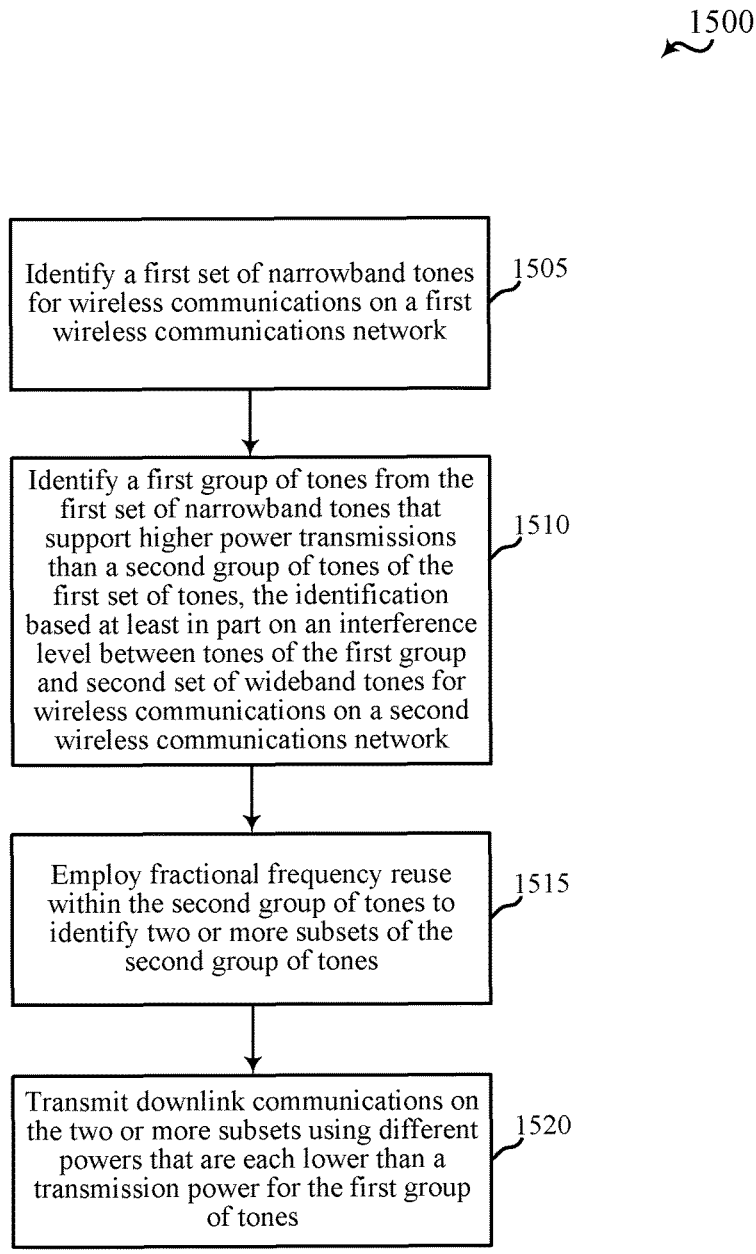
FIG. 15 shows a flowchart illustrating a method for allocation of frequency resources for a CIoT system in accordance with various aspects of the present disclosure.

FIG. 15 shows a flowchart illustrating a method 1500 for allocation of frequency resources for a CIoT system in accordance with various aspects of the present disclosure. The operations of method 1500 may be implemented by a base station 105 or its components as described with reference to FIGS. 1-11, or by a device 701 or 801 described with reference to FIG. 7 or 8. For example, the operations of method 1500 may be performed by the communication management module 710 as described with reference to FIGS. 7-11. In some examples, a base station 105 may execute a set of codes to control the functional elements of the base station 105 to perform the functions described below. Additionally or alternatively, the base station 105 may perform aspects of the functions described below using special-purpose hardware.

At block 1505, the method 1500 includes identifying a first set of narrowband tones for wireless communications on a first wireless communications network as described above with reference to FIGS. 2-6. In certain examples, the operations of block 1505 may be performed by the tone identification module 805 as described above with reference to FIGS. 8-9.

At block 1510, the method 1500 may include identifying a first group of tones from the first set of narrowband tones that support higher power transmissions than a second group of tones of the first set of tones, the identification based at least in part on an interference level between tones of the first group and second set of wideband tones for wireless communications on a second wireless communications network as described above with reference to FIGS. 2-6. In certain examples, the operations of block 1510 may be performed by the group identification module 810 as described above with reference to FIGS. 8-9.

At block 1515, the method 1500 includes employing fractional frequency reuse within the second group of tones to identify two or more subsets of the second group of tones as described above with reference to FIGS. 2-6. In certain examples, the operations of block 1515 may be performed by the group identification module 810 or the FFR module 935 as described above with reference to FIGS. 7-9.

At block 1520, the method 1500 includes transmitting downlink communications on the two or more subsets using different transmission powers that are each lower than a transmission power for the first group of tones as described above with reference to FIGS. 2-6. In certain examples, the operations of block 1520 may be performed by the group identification module 810, the FFR module 935, or the transmitter 715 as described above with reference to FIGS. 7-9.

Figure 16:
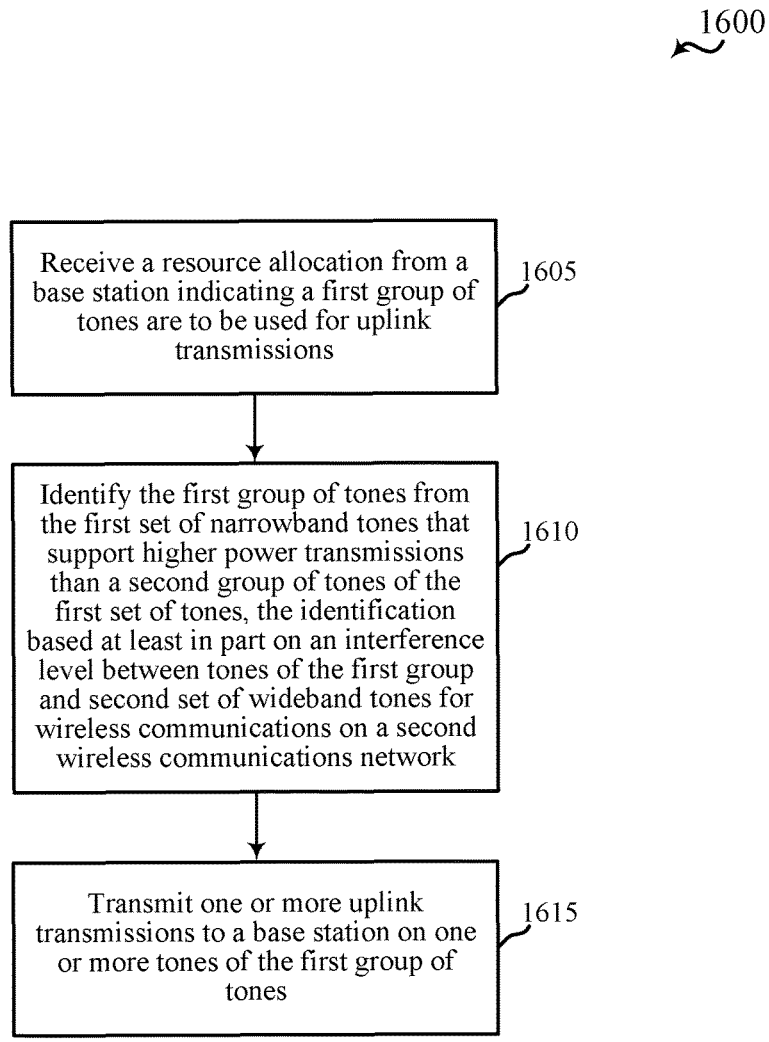
FIG. 16 shows a flowchart illustrating a method for allocation of frequency resources for a CIoT system in accordance with various aspects of the present disclosure.

FIG. 16 shows a flowchart illustrating a method 1600 for allocation of frequency resources for a CIoT system in accordance with various aspects of the present disclosure. The operations of method 1600 may be implemented by a UE 115 or its components as described with reference to FIGS. 1-10, or by a device 701 or 801 described with reference to FIG. 7 or 8. For example, the operations of method 1600 may be performed by the communication management module 710 as described with reference to FIGS. 7-11. In some examples, a UE 115 may execute a set of codes to control the functional elements of the UE 115 to perform the functions described below. Additionally or alternatively, the UE 115 may perform aspects of the functions described below using special-purpose hardware.

At block 1605, the method 1600 includes receiving a resource allocation from a base station indicating a first group of tones are to be used for uplink transmissions as described above with reference to FIGS. 2-6. In certain examples, the operations of block 1605 may be performed by the group identification module 810 or resource allocation module 920 as described above with reference to FIGS. 8-9.

At block 1610, the method 1600 may include identifying a first group of tones from the first set of narrowband tones that support higher power transmissions than a second group of tones of the first set of tones, the identification based at least in part on an interference level between tones of the first group and second set of wideband tones for wireless communications on a second wireless communications network as described above with reference to FIGS. 2-6. In certain examples, the operations of block 1610 may be performed by the group identification module 810 as described above with reference to FIGS. 8-9.

At block 1615, the method 1600 includes transmitting one or more uplink transmissions to a base station on one or more tones of the first group of tones as described above with reference to FIGS. 2-6. In certain examples, the operations of block 1615 may be performed by the group identification module 810, the frequency hopping module 915, or the transmitter 715 as described above with reference to FIGS. 8-9.

Thus, methods 1200, 1300, 1400, 1500, and 1600 may provide for allocation of frequency resources for a CIoT system. It should be noted that methods 1200, 1300, 1400, 1500, and 1600 describe possible implementation, and that the operations and the steps may be rearranged or otherwise modified such that other embodiments are possible. In some examples, aspects from two or more of the methods 1200, 1300, 1400, 1500, and 1600 may be combined.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of communication at a wireless device comprising:
    identifying, from a set of narrowband tones for wireless communications on a first wireless communications network, a first group of narrowband tones and a second group of narrowband tones, wherein the first group of narrowband tones supports higher power transmissions than the second group of narrowband tones;
    selecting the first group of narrowband tones based at least in part on an interference level between the first group of narrowband tones and a set of wideband tones for wireless communications on a second wireless communications network; and
    transmitting a communication via the selected first group of narrowband tones.

2. The method of claim 1, wherein:
    the set of narrowband tones comprises a first plurality of tones having a first frequency spacing between adjacent tones in a first available uplink/downlink bandwidth of the first wireless communications network, the set of wideband tones comprises a second plurality of tones having a second frequency spacing between adjacent tones in a second available uplink/downlink bandwidth of the second wireless communications network, and the second frequency spacing is an integer multiple of the first frequency spacing.

3. The method of claim 2, wherein a spacing between frequency carriers of the first wireless communications network and the second wireless communications network is the integer multiple of the first frequency spacing.

4. The method of claim 2, wherein the first group of narrowband tones comprises tones that generate less interference with tones of the set of wideband tones relative to the second group of narrowband tones of the set of narrowband tones.

5. The method of claim 1, further comprising:
determining that a user equipment (UE) has channel conditions that warrant transmissions on the first group of narrowband tones; and
transmitting a resource allocation to the UE, the resource allocation indicating that the first group of narrowband tones are allocated for the UE.

6. The method of claim 1, further comprising:
transmitting one or more downlink transmissions to a first user equipment (UE) using higher power transmissions on one or more tones of the first group of narrowband tones; and
transmitting one or more downlink transmissions to a second UE using lower power transmissions on one or more tones of the second group of narrowband tones.

7. The method of claim 6, further comprising:
determining that the first UE has channel conditions that indicate a higher transmission power for reliable communications.

8. The method of claim 7, wherein the determining is based at least in part on a latency target for communications to the first UE and a path loss associated with the first UE.

9. The method of claim 6, wherein transmitting the one or more downlink transmissions to the first UE comprises using frequency hopping among tones of the first group of narrowband tones.

10. The method of claim 1, further comprising:
employing fractional frequency reuse within the second group of narrowband tones to identify two or more subsets of the second group of narrowband tones; and
transmitting downlink communications on the two or more subsets using different powers that are each lower than a transmission power for the first group of narrowband tones.

11. The method of claim 1, wherein the identifying the first group of narrowband tones comprises:
receiving a resource allocation from a base station indicating that the first group of narrowband tones are allocated for uplink transmissions.

12. The method of claim 11, further comprising:
transmitting one or more uplink transmissions to the base station on one or more tones of the first group of narrowband tones.

13. The method of claim 12, wherein transmitting the one or more uplink transmissions to the base station comprises:
transmitting using frequency hopping among tones of the first group of narrowband tones.

14. The method of claim 1, further comprising:
receiving a resource allocation from a base station indicating that the second group of narrowband tones are allocated for uplink transmissions;
employing fractional frequency reuse within the second group of narrowband tones to identify two or more subsets of the second group of narrowband tones; and
transmitting uplink communications on the two or more subsets using different powers that are each lower than a transmission power for the first group of narrowband tones.

15. The method of claim 1, wherein the set of narrowband tones comprises orthogonal frequency division multiple access (OFDMA) tones and the set of wideband tones comprises OFDMA tones.

16. An apparatus for wireless communication at a wireless device, comprising:
means for identifying, from a set of narrowband tones for wireless communications on a first wireless communications network, a first group of narrowband tones and a second group of narrowband tones, wherein the first group of narrowband tones supports higher power transmissions than the second group of narrowband tones;
means for selecting the first group of narrowband tones based at least in part on an interference level between the first group of narrowband tones and a set of wideband tones for wireless communications on a second wireless communications network; and
means for transmitting a communication via the selected first group of narrowband tones.

17. The apparatus of claim 16, wherein the set of narrowband tones comprises a first plurality of tones having a first frequency spacing between adjacent tones in a first available uplink/downlink bandwidth of the first wireless communications network, the set of wideband tones comprises a second plurality of tones having a second frequency spacing between adjacent tones in a second available uplink/downlink bandwidth of the second wireless communications network, and the second frequency spacing is an integer multiple of the first frequency spacing.

18. The apparatus of claim 16, further comprising:
means for determining that a user equipment (UE) has channel conditions that warrant transmissions on the first group of narrowband tones; and
means for transmitting a resource allocation to the UE, the resource allocation indicating that the first group of narrowband tones are allocated for the UE.

19. An apparatus for communication at a wireless device, comprising:
a processor;
memory in electronic communication with the processor; and
instructions stored in the memory; wherein the instructions are executable by the processor to:
identify, from a set of narrowband tones for wireless communications on a first wireless communications network, a first group of narrowband tones and a second group of narrowband tones, wherein the first group of narrowband tones supports higher power transmissions than the second group of narrowband tones;
select the first group of narrowband tones based at least in part on an interference level between the first group of narrowband tones and a set of wideband tones for wireless communications on a second wireless communications network; and
transmit a communication via the selected first group of narrowband tones.

20. The apparatus of claim 19, wherein the set of narrowband tones comprises a first plurality of tones having a first frequency spacing between adjacent tones in a first available uplink/downlink bandwidth of the first wireless communications network, the set of wideband tones comprises a second plurality of tones having a second frequency spacing between adjacent tones in a second available uplink/downlink bandwidth of the second wireless communications network, and the second frequency spacing is an integer multiple of the first frequency spacing.

21. The apparatus of claim 20, wherein a spacing between frequency carriers of the first wireless communications network and the second wireless communications network is the integer multiple of the first frequency spacing.

22. The apparatus of claim 20, wherein the first group of narrowband tones comprises tones that generate less interference with tones of the set of wideband tones relative to the second group of narrowband tones of the set of narrowband tones.

23. The apparatus of claim 19, wherein the instructions are executable by the processor to:
determine that a user equipment (UE) has channel conditions that warrant transmissions on the first group of narrowband tones; and
transmit a resource allocation to the UE, the resource allocation indicating the first group of narrowband tones are allocated for the UE.

24. The apparatus of claim 19, wherein the instructions are executable by the processor to:
transmit one or more downlink transmissions to a first user equipment (UE) using higher power transmissions on one or more tones of the first group of narrowband tones; and
transmit one or more downlink transmissions to a second UE using lower power transmissions on one or more tones of the second group of narrowband tones.

25. The apparatus of claim 24, wherein the instructions are executable by the processor to:
determine that the first UE has channel conditions that indicate a higher transmission power for reliable communications.

26. The apparatus of claim 25, wherein the determining is based at least in part on a latency target for communications to the first UE and a path loss associated with the first UE.

27. The apparatus of claim 24, wherein the instructions are executable by the processor to:
transmit the one or more downlink transmissions to the first UE comprises transmitting using frequency hopping among tones of the first group of narrowband tones.

28. The apparatus of claim 19, wherein the instructions are executable by the processor to:
employ fractional frequency reuse within the second group of narrowband tones to identify two or more subsets of the second group of narrowband tones; and
transmit downlink communications on the two or more subsets using different powers that are each lower than a transmission power for the first group of narrowband tones.

29. The apparatus of claim 19, wherein the instructions are executable by the processor to:
receive a resource allocation from a base station indicating the second group of narrowband tones are allocated for uplink transmissions;
employ fractional frequency reuse within the second group of narrowband tones to identify two or more subsets of the second group of narrowband tones; and
transmit uplink communications on the two or more subsets using different powers that are each lower than a transmission power for the first group of narrowband tones.

30. A non-transitory computer-readable medium storing code for communication at a wireless device, the code comprising instructions executable to:
identify, from a set of narrowband tones for wireless communications on a first wireless communications network, a first group of narrowband tones and a second group of narrowband tones, wherein the first group of narrowband tones supports higher power transmissions than the second group of narrowband tones;
select the first group of narrowband tones based at least in part on an interference level between the first group of narrowband tones and a set of wideband tones for wireless communications on a second wireless communications network; and
transmit a communication via the selected first group of narrowband tones.

* * * * *